(12) United States Patent
Emura

(10) Patent No.: US 9,868,470 B2
(45) Date of Patent: Jan. 16, 2018

(54) VEHICLE BODY SIDE STRUCTURE

(71) Applicant: HONDA MOTOR CO., LTD., Tokyo (JP)

(72) Inventor: Masahiko Emura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/127,954

(22) PCT Filed: Mar. 23, 2015

(86) PCT No.: PCT/JP2015/058719
§ 371 (c)(1),
(2) Date: Sep. 21, 2016

(87) PCT Pub. No.: WO2015/146902
PCT Pub. Date: Oct. 1, 2015

(65) Prior Publication Data
US 2017/0101133 A1   Apr. 13, 2017

(30) Foreign Application Priority Data
Mar. 25, 2014   (JP) ................. 2014-061799

(51) Int. Cl.
B60N 99/00    (2006.01)
B62D 25/04    (2006.01)
B62D 21/15    (2006.01)
B60J 5/04     (2006.01)

(52) U.S. Cl.
CPC .............. *B62D 25/04* (2013.01); *B60J 5/047* (2013.01); *B62D 21/157* (2013.01); *B60Y 2306/01* (2013.01); *B60Y 2410/124* (2013.01)

(58) Field of Classification Search
CPC .. B62D 25/04; B62D 21/157; B60Y 2306/01; B60Y 2410/124; B60J 5/047
See application file for complete search history.

(56) References Cited

U.S. PATENT DOCUMENTS

2010/0259072 A1* 10/2010 Mizohata ............... B62D 25/02
                                                    296/203.03
2012/0299334 A1* 11/2012 Takayama ............. B62D 25/02
                                                    296/193.06

FOREIGN PATENT DOCUMENTS

| JP | 07-081615   | 3/1995  |
| JP | 09-267767   | 10/1997 |
| JP | 2001-310762 | 11/2001 |
| JP | 2007-302029 | 11/2007 |
| JP | 2007-326376 | 12/2007 |
| JP | 2012-025174 | 2/2012  |

(Continued)

OTHER PUBLICATIONS

International Search Report, dated Jun. 2, 2015 (Jun. 2, 2015).

*Primary Examiner* — Lori L Lyjak
(74) *Attorney, Agent, or Firm* — Rankin, Hill & Clark LLP

(57) ABSTRACT

A vehicle body side structure includes a left center pillar, and the left center pillar includes a pillar inner, a pillar stiffener, and an inner reinforcing member. The pillar stiffener is joined to the inner front flange and the inner rear flange of the pillar inner, thereby forming a pillar closed section. The inner reinforcing member is arranged in the pillar closed section. The inner reinforcing front flange and the inner reinforcing rear flange of the inner reinforcing member are joined to the inner inside wall of the pillar inner.

5 Claims, 17 Drawing Sheets

(56) References Cited

FOREIGN PATENT DOCUMENTS

| JP | 2012-056407 | 3/2012 |
|----|-------------|--------|
| JP | 2013-023038 | 2/2013 |

* cited by examiner

VEHICLE BODY SIDE STRUCTURE

TECHNICAL FIELD

The present invention relates to a vehicle body side structure including a center pillar extending in the vertical direction on a body side portion.

BACKGROUND ART

In a vehicle body side structure, generally, a center pillar is formed into a hollow shape with an almost rectangular section by a pillar outer, a pillar inner and a pillar stiffener. Hinge mount portions on the center pillar bulge outward in the vehicle width direction with respect to other portions. A side door is mounted on the hinge mount portions via door hinges.

Since the hinge mount portions bulge outward in the vehicle width direction with respect to the other portions, gaps are formed between the side door and the other portions of the center pillar.

When performing electrodeposition coating of the vehicle body side structure, an electrodeposition coating solution is made to enter the gaps between the side door and the other portions of the center pillar, thereby coating the opposing surfaces of the center pillar and the side door with the electrodeposition coating solution.

In addition, the center pillar has a pillar gap between the pillar outer and the pillar stiffener to coat the pillar opposing surfaces of the pillar outer and the pillar stiffener with the electrodeposition coating solution.

The hinge mount portions are formed by the pillar outer and the pillar stiffener, and door hinges are fastened to the hinge mount portions by bolts and nuts.

Hence, when the pillar gap is formed on each hinge mount portion, a gap intervenes between the bolts and the nuts upon mounting the door hinge on the hinge mount portion. It is therefore difficult to ensure the tightening torque of the bolts within a predetermined range and manage the tightening torque.

As a countermeasure, a means for eliminating the pillar gap by making the pillar stiffener bulge outward in the vehicle width direction in conformity with the pillar outer is used (for example, see Patent Document 1).

However, when the means for eliminating the pillar gap by making the pillar stiffener bulge is employed, stress concentrates to the bulge portions of the pillar stiffener, and it is difficult to ensure the rigidity of the center pillar.

It is therefore necessary to make a contrivance to cause the center pillar to suitably absorb an impact load that is input to the center pillar from outside in the vehicle width direction.

In addition, each of the pillar outer, the pillar inner, and the pillar stiffener of the center pillar includes a front flange and a rear flange. The front flanges are overlaid and joined, and the rear flanges are overlaid and joined, thereby forming a hollow center pillar with an almost rectangular section.

Hence, when an impact load is input to the center pillar from outside in the vehicle width direction, the center pillar is crushed inward in the vehicle width direction and also deformed so as to stretch in the back-and-forth direction of the vehicle body. When the center pillar is crushed inward in the vehicle width direction, the interior space is assumed to decrease.

Furthermore, when the center pillar is crushed, a stress probably concentrates to the joints of the front flanges and the rear flanges of the center pillar, and therefore, a contrivance to ensure the rigidity of the center pillar needs to be made.

PRIOR ART DOCUMENT

Patent Document

PATENT DOCUMENT 1: Japanese Patent Laid-Open No. 7-81615

SUMMARY OF INVENTION

Problems that the Invention is to Solve

It is a problem of the present invention to provide a vehicle body side structure capable of suitably absorbing an impact load, further suppressing a decrease in the interior space, and additionally ensuring rigidity.

Means for Solving the Problems

The invention according to aspect 1 provides a vehicle body side structure including a center pillar extending in a vertical direction on a body side portion, wherein the center pillar comprises: a pillar inner provided inside in a vehicle width direction; a pillar stiffener including a portion formed into a substantially U-shaped section so as to form a closed section together with the pillar inner when joined to the pillar inner from outside in the vehicle width direction; and an inner reinforcing member arranged in the closed section between the pillar stiffener and the pillar inner, the pillar inner is formed into a substantially hat-shaped section by: an inner inside wall arranged inside in the vehicle width direction; an inner front wall and an inner rear wall, which extend outward in the vehicle width direction from ends on vehicle body front and rear sides out of the inner inside wall; an inner front flange extending from the inner front wall to the vehicle body front side and joined to the pillar stiffener; and an inner rear flange extending from the inner rear wall to the vehicle body rear side and joined to the pillar stiffener, the inner reinforcing member is formed into a substantially hat-shaped section by: an inner reinforcing outside wall arranged outside in the vehicle width direction; an inner reinforcing front wall and an inner reinforcing rear wall, which extend inward in the vehicle width direction from ends on the body front and rear sides out of the inner reinforcing outside wall; an inner reinforcing front flange extending from the inner reinforcing front wall to the body front side; and an inner reinforcing rear flange extending from the inner reinforcing rear wall to the body rear side, and the inner reinforcing front flange and the inner reinforcing rear flange are joined to the inner inside wall of the pillar inner.

In the invention according to aspect 2, preferably, the center pillar comprises a stiffener reinforcing member formed from a structure independent of the inner reinforcing member and extending in the vertical direction outside the inner reinforcing member in the vehicle width direction, and the stiffener reinforcing member is joined to an inside of the pillar stiffener in the vehicle width direction and arranged so as to overlap the inner reinforcing member in the vehicle width direction.

The inner reinforcing member is formed into a substantially hat-shaped section, and the inner reinforcing front flange and the inner reinforcing rear flange of the inner reinforcing member are joined to the inner inside wall of the pillar inner. Hence, since the width of the inner reinforcing member in the vehicle width direction is suppressed small, it is difficult to make the ridge lines (corner portions) of the inner reinforcing member close to the ridge lines of the pillar stiffener.

For this reason, if an impact load is input to the pillar stiffener from outside in the vehicle width direction, the input impact load cannot quickly be supported by the ridge lines of the inner reinforcing member.

The width of the inner reinforcing member in the vehicle width direction may be increased to make the ridge lines (corner portions) of the inner reinforcing member close to the ridge lines of the pillar stiffener. However, when the width of the inner reinforcing member in the vehicle width direction is increased, it is difficult to sufficiently ensure the inner reinforcing front flange and the inner reinforcing rear flange of the inner reinforcing member.

It is therefore difficult to join the inner reinforcing front flange and the inner reinforcing rear flange to the inner inside wall of the pillar inner by spot welding. Although they can be joined by MG welding or laser welding, the operation time undesirably increases in this case.

As a method of ensuring the inner reinforcing front flange and the inner reinforcing rear flange in a state in which the width of the inner reinforcing member in the vehicle width direction is increased, the inner reinforcing front flange and the inner reinforcing rear flange may be arranged inside the inner reinforcing member. However, when the flanges are arranged inside the inner reinforcing member, the interval between the flanges becomes smaller than the width of the inner reinforcing member, and the inner reinforcing member attains a so-called undercut shape.

Hence, a press die used for press molding of the inner reinforcing member cannot be removed from the inner reinforcing member, and the inner reinforcing member cannot be press-molded.

In aspect 2, a stiffener reinforcing member is provided outside the inner reinforcing member in the vehicle width direction. In addition, the stiffener reinforcing member is joined to the inside of the pillar stiffener in the vehicle width direction and arranged so as to overlap the inner reinforcing member in the vehicle width direction.

In the invention according to aspect 3, preferably, the stiffener reinforcing member is formed into a substantially U-shaped section by: a stiffener reinforcing outside wall arranged outside in the vehicle width direction; and a stiffener reinforcing front wall and a stiffener reinforcing rear wall, which extend inward in the vehicle width direction from ends on the body front and rear sides out of the stiffener reinforcing outside wall, the inner reinforcing member comprises an inner reinforcing section enlarging portion which is arranged in substantially the U-shaped section formed by the stiffener reinforcing member and whose width in a back-and-forth direction of the vehicle body increases downward, and each of the stiffener reinforcing front wall and the stiffener reinforcing rear wall comprises, at a portion facing the inner reinforcing section enlarging portion, a projection reducing portion whose projection width in the vehicle width direction is smaller as compared to other portions.

The stiffener reinforcing member is formed along the pillar stiffener such that the width becomes almost constant from the upper side to the lower side.

On the other hand, the inner reinforcing member includes an inner reinforcing section enlarging portion whose width in the back-and-forth direction of the vehicle body increases downward.

For this reason, the stiffener reinforcing member may hit the inner reinforcing section enlarging portion.

Hence, in aspect 3, each of the stiffener reinforcing front wall and the stiffener reinforcing rear wall includes, at a portion facing the inner reinforcing section enlarging portion, a projection reducing portion, and the projection width of the projection reducing portion is made small.

In the invention according to aspect 4, preferably, the pillar stiffener comprises a stiffener outside wall which forms a wall portion outside in the vehicle width direction, the stiffener outside wall comprises: a general surface arranged at a predetermined interval with respect to the stiffener reinforcing member; a hinge mount surface which bulges outward in the vehicle width direction with respect to the general surface and on which a door hinge configured to support a side door is mounted; and a continuous surface through which the hinge mount surface and the general surface continue, and the stiffener reinforcing outside wall is joined to the general surface on upper and lower sides of the hinge mount surface and arranged with a gap larger than the predetermined interval with respect to the hinge mount surface.

In the invention according to aspect 5, preferably, each of the stiffener reinforcing front wall and the stiffener reinforcing rear wall comprises, at a portion facing the continuous surface of the pillar stiffener, a projection enlarging portion whose projection width is larger as compared to other portions.

The hinge mount surface of the stiffener outside wall bulges outward in the vehicle width direction, and the hinge mount surface and the general surface continue via the continuous surface. Hence, the ridge lines of the continuous surface extend to tilt with respect to the vertical direction (that is, the ridge lines of the general surface and the ridge lines of the hinge mount surface). For this reason, the rigidity/strength of the continuous surface may be lower than that of the general surface or the hinge mount surface.

In aspect 5, each of the stiffener reinforcing front wall and the stiffener reinforcing rear wall includes a projection enlarging portion. The projection enlarging portion is arranged at a portion facing the continuous surface of the stiffener outside wall, and the projection width is made larger than those of other portions.

In the invention according to aspect 6, preferably, a nut configured to mount the door hinge is arranged in the gap formed between the hinge mount surface and the stiffener reinforcing outside wall.

To coat the opposing surfaces of the pillar stiffener and the stiffener reinforcing member with an electrodeposition coating solution, a gap is formed between the pillar stiffener and the stiffener reinforcing member.

Hence, when the door hinge is fastened to the pillar stiffener and the stiffener reinforcing member by bolts and nuts, the gap intervenes between the bolts and the nuts. It is therefore difficult to ensure the tightening torque of the bolts within a predetermined range and manage the tightening torque.

In aspect 6, a nut is arranged in the gap formed between the hinge mount surface of the pillar stiffener and the stiffener reinforcing outside wall of the inner reinforcing member.

In the invention according to aspect 7, preferably, in the stiffener reinforcing member, at a portion facing the nut, a through hole configured to avoid interference of a bolt fastened to the nut is formed, and the door hinge is mounted on the hinge mount surface by the bolt and the nut.

Effects of Invention

In the invention according to aspect 1, the closed section is formed by the pillar stiffener and the pillar inner, and the inner reinforcing member is arranged in the closed section. Additionally, the pillar inner is formed into a substantially hat-shaped section so as to bulge inward in the vehicle width direction, and the inner reinforcing member is formed into a substantially hat-shaped section so as to bulge outward in the vehicle width direction.

Furthermore, the inner reinforcing front flange and the inner reinforcing rear flange of the inner reinforcing member are joined to the inner inside wall of the pillar inner. The inner reinforcing member bulges outward (that is, toward the pillar stiffener) in the vehicle width direction.

If an impact load is input to the pillar stiffener from outside in the vehicle width direction, the pillar stiffener is deformed inward in the vehicle width direction and hits the inner reinforcing member. Hence, the impact load input to the pillar stiffener is transmitted to the inner front flange and the inner rear flange of the pillar inner and also transmitted to the inner inside wall of the pillar inner via the inner reinforcing member.

Accordingly, the impact load input to the pillar stiffener can be distributed to the inner front flange, the inner rear flange, and the inner inside wall and suitably absorbed by the center pillar, and the shock absorption performance of the center pillar can be increased.

In addition, the inner reinforcing member bulges outward in the vehicle width direction. Hence, the pillar stiffener deformed toward the center in the vehicle width direction by the impact load input from outside in the vehicle width direction hits the inner reinforcing member and transmits the load, thereby allowing the inner reinforcing member to support the impact load.

This can suppress compressive deformation of the center pillar inward in the vehicle width direction and a decrease in the space of the interior.

In addition, the impact load input to the pillar stiffener is distributed to the inner front flange and the inner rear flange of the pillar inner and the inner inside wall of the pillar inner.

Hence, the load transmitted to the inner front flange and the inner rear flange of the pillar inner can be suppressed. The strength is maintained in the flange joints of the center pillar, and the rigidity of the center pillar is ensured.

In the invention according to aspect 2, the stiffener reinforcing member is provided outside the inner reinforcing member in the vehicle width direction. The stiffener reinforcing member is joined to the inside of the pillar stiffener in the vehicle width direction and arranged so as to overlap the inner reinforcing member in the vehicle width direction.

That is, a stiffener reinforcing member that is a structure independent of the inner reinforcing member is provided. The stiffener reinforcing member intervenes between the pillar stiffener and the inner reinforcing member so as to overlap in the vehicle width direction. Hence, the ridge lines of the stiffener reinforcing member can be made close to the ridge lines of the pillar stiffener.

It is also possible to sufficiently ensure the inner reinforcing front flange and the inner reinforcing rear flange of the inner reinforcing member and firmly join the flanges to the inner inside wall of the pillar inner by spot welding.

The ridge lines of the stiffener reinforcing member are made close to the ridge lines of the pillar stiffener. Accordingly, an impact load input to the pillar stiffener from outside in the vehicle width direction can quickly be supported by the ridge lines of the stiffener reinforcing member or inner reinforcing member, and the rigidity/strength of the center pillar can be increased.

When the stiffener reinforcing member is joined to the inside of the pillar stiffener in the vehicle width direction, the two members on the exterior side are integrally joined to the outer assembly portion.

In addition, when the inner reinforcing front flange and the inner reinforcing rear flange of the inner reinforcing member are joined to the inner inside wall of the pillar inner, the two members on the interior side are integrally joined to the inner assembly portion.

When the pillar stiffener of the outer assembly portion and the pillar inner of the inner assembly portion are joined, the center pillar is joined to the closed section.

Hence, after the pillar stiffener and the pillar inner are joined to the closed section, the stiffener reinforcing member or the inner reinforcing member need not be joined in the closed section by spot welding. Accordingly, an insertion hole used to insert a spot gun into the closed section can be obviated from the pillar stiffener or the pillar inner, and the rigidity/strength of the center pillar can be ensured.

The stiffener reinforcing member is arranged so as to overlap the inner reinforcing member in the vehicle width direction. Hence, an impact load input to the pillar stiffener can quickly be transmitted to the inner reinforcing member via the stiffener reinforcing member.

This allows the center pillar to suitably absorb the impact load input to the pillar stiffener and attain high shock absorption performance.

In the invention according to aspect 3, each of the stiffener reinforcing front wall and the stiffener reinforcing rear wall includes the projection reducing portion at the portion facing the inner reinforcing section enlarging portion, and the projection width of the projection reducing portion is made small.

It is therefore possible to prevent the stiffener reinforcing front wall and the stiffener reinforcing rear wall from hitting the inner reinforcing member. This can increase the degree of freedom of design when determining the shapes of the stiffener reinforcing member and the inner reinforcing member.

In addition, each of the stiffener reinforcing front wall and the stiffener reinforcing rear wall includes a projection reducing portion, and the projection width is made small only for the projection reducing portions. Hence, the projection width can be increased almost all over the stiffener reinforcing member.

The sectional shape can thus be made large almost all over the stiffener reinforcing member, and the rigidity/strength of the stiffener reinforcing member can sufficiently be ensured.

In the invention according to aspect 4, the stiffener reinforcing outside wall of the stiffener reinforcing member is joined to the general surface on the upper and lower sides of the hinge mount surface and arranged with a large gap with respect to the hinge mount surface. Hence, a portion of the stiffener reinforcing outside wall facing the hinge mount surface need not bulge outward in the vehicle width direction, unlike the stiffener outside wall.

Accordingly, the ridge lines of the stiffener reinforcing member can be extended on an almost straight line in the vertical direction, and rigidity can be ensured all over the ridge lines. It is therefore possible to ensure the rigidity/strength of the stiffener reinforcing member, that is, the center pillar.

In the invention according to aspect 5, each of the stiffener reinforcing front wall and the stiffener reinforcing rear wall includes a projection enlarging portion. The projection enlarging portion is arranged at a portion facing the continuous surface of the stiffener outside wall, and the projection width is made larger than those of other portions. Hence, the rigidity/strength of the projection enlarging portions can be made higher than those of the other portions.

The continuous surface having a rigidity/strength lower than those of the general surface and the hinge mount surface can thus be reinforced by the projection enlarging portions, and the rigidity/strength of the center pillar can be ensured.

The continuous surface of the stiffener outside wall is provided near the hinge mount surface (that is, the door hinge). Hence, an impact load is input from the door hinge to the continuous surface at an early stage.

When the continuous surface is reinforced by the projection enlarging portions, the impact load input to the continuous surface can suitably be supported.

In the invention according to aspect 6, a nut is arranged in the gap formed between the hinge mount surface of the pillar stiffener and the stiffener reinforcing outside wall of the stiffener reinforcing member.

Hence, when mounting the door hinge, the stiffener reinforcing member need not intervene between the bolts and the nuts. It is therefore possible to mount the door hinge to the hinge mount surface without intervention of the gap between the bolts and the nuts when the bolts for mounting are fastened to the nuts.

This can prevent the tightening torque of the bolts from being affected by the gap between the hinge mount surface and the stiffener reinforcing outside wall. Hence, when mounting the door hinge on the hinge mount surface, the tightening torque of the bolts can be ensured within a predetermined range and easily managed.

In the invention according to aspect 7, a through hole is formed in the stiffener reinforcing member at a portion facing the nut. The through hole can avoid a bolt from interfering with the stiffener reinforcing member. The tightening torque of the bolts can thus more easily be ensured within a predetermined range.

BRIEF DESCRIPTION OF DRAWINGS

FIG. 16 Views for explaining an example in which an impact load input to the left center pillar according to the present invention is supported by the inner reinforcing member and the like.

FIG. 17 Views for explaining an example in which an impact load input to the left center pillar according to the present invention is supported by the stiffener reinforcing member and the like.

THE MODE FOR CARRYING OUT THE INVENTION

Figure 1:
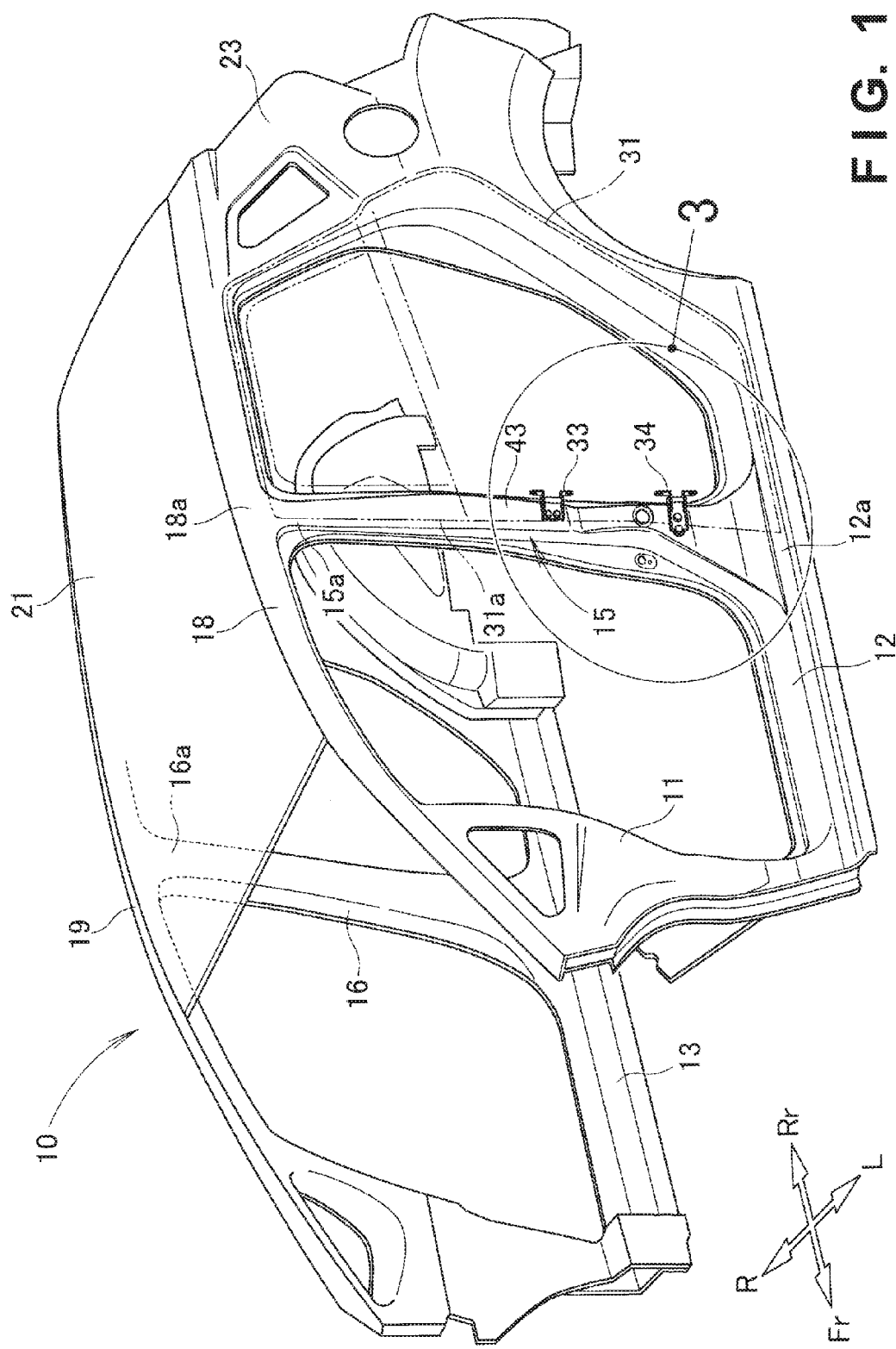
FIG. 1 A perspective view showing a vehicle body side structure according to the present invention.

The best mode for carrying out the invention will now be described with reference to the accompanying drawings. Note that "front (Fr)", "rear (Rr)", "left (L)", and "right (R)" comply with directions viewed from a driver. In the drawings, "the direction of an arrow L-R" is "the vehicle width direction", and "the direction of an arrow Fr-Rr" is "the back-and-forth direction of the vehicle body".

Embodiment

A vehicle body side structure 10 according to the embodiment will be described.

As shown in FIG. 1, the vehicle body side structure 10 includes left and right side sills 12 and 13 extending in the back-and-forth direction of the vehicle body on the left and right sides of the vehicle body, left and right center pillars 15 and 16 vertically extending upward from the middle in the longitudinal direction of the left and right side sills 12 and 13, left and right roof side rails 18 and 19 connected to upper ends 15a and 16a of the left and right center pillars 15 and 16, respectively, and a roof panel 21 that covers the left and right roof side rails 18 and 19 from above.

Note that the vehicle body side structure 10 includes members that are bilaterally symmetrical to each other. Left members will be described below, and a description of right members will be omitted.

Figure 2:
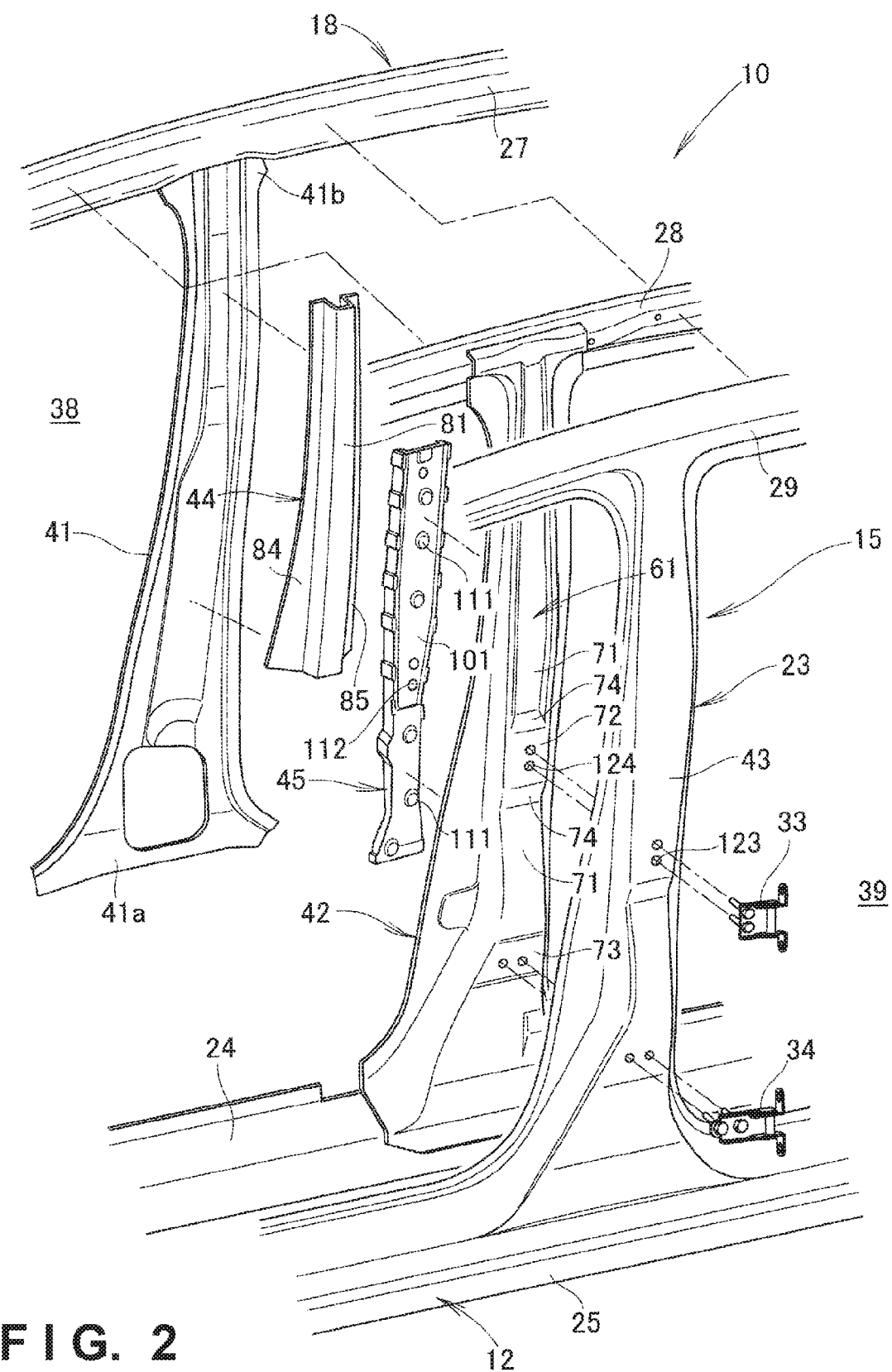
FIG. 2 An exploded perspective view showing a left center pillar provided in the vehicle body side structure shown in FIG. 2.

As shown in FIG. 2, the left side sill 12 includes a sill stiffener 24 extending in the back-and-forth direction of the vehicle body, and a sill outer 25 extending along the sill stiffener 24.

The left roof side rail 18 includes a rail inner 27 extending in the back-and-forth direction of the vehicle body, a rail stiffener 28 extending along the rail inner 27, and a rail outer 29 extending along the rail stiffener 28.

Referring back to FIG. 1, the left center pillar 15 extends in the vertical direction so as to connect a center portion 12a of the left side sill 12 and a center portion 18a of the left roof side rail 18. The left center pillar 15 is provided on a left body side portion 11. A rear side door 31 is supported by the left center pillar 15 so as to freely open/close.

Figure 3:
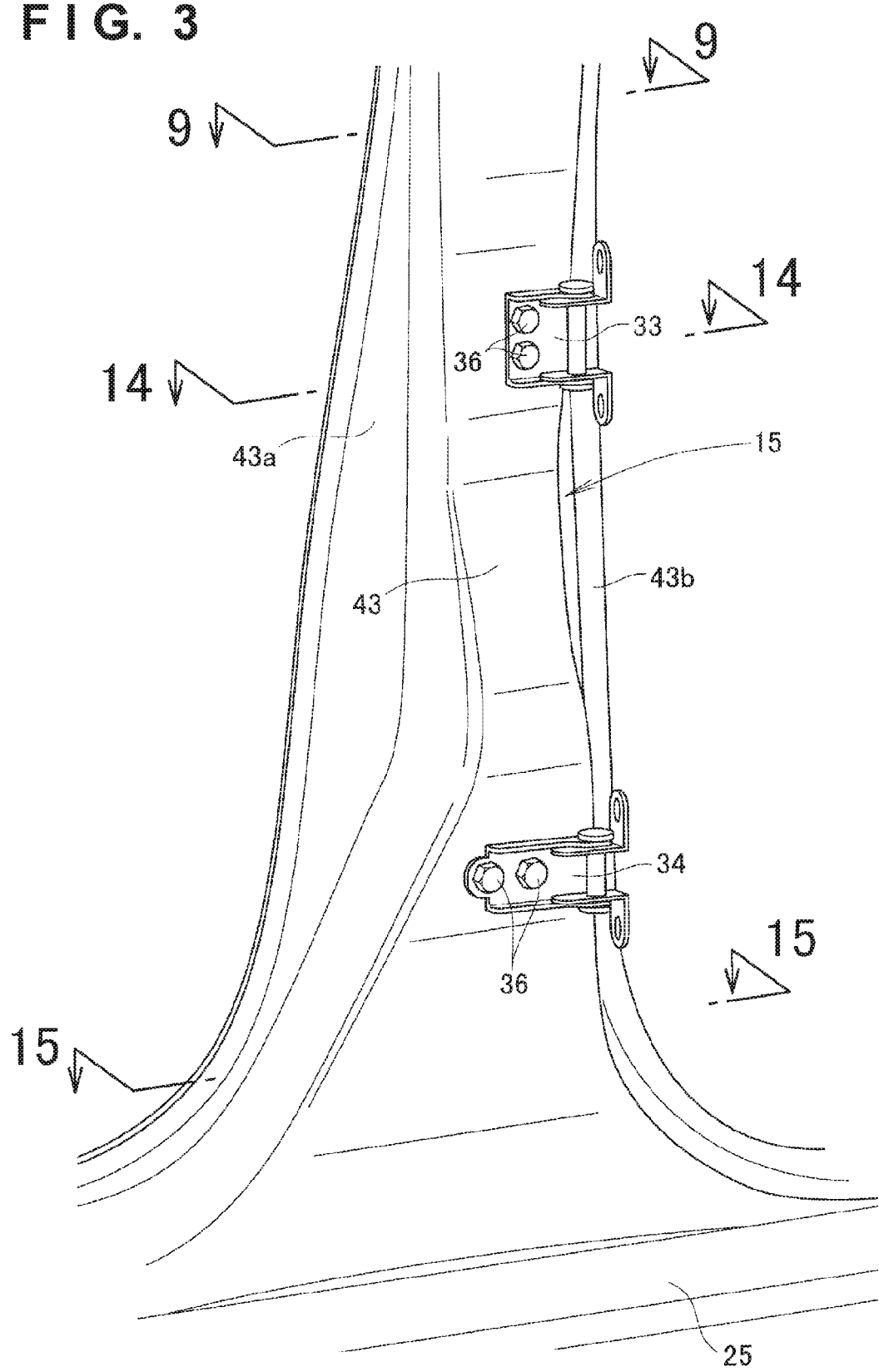
FIG. 3 An enlarged view of a portion 3 in FIG. 1.
Figure 4:
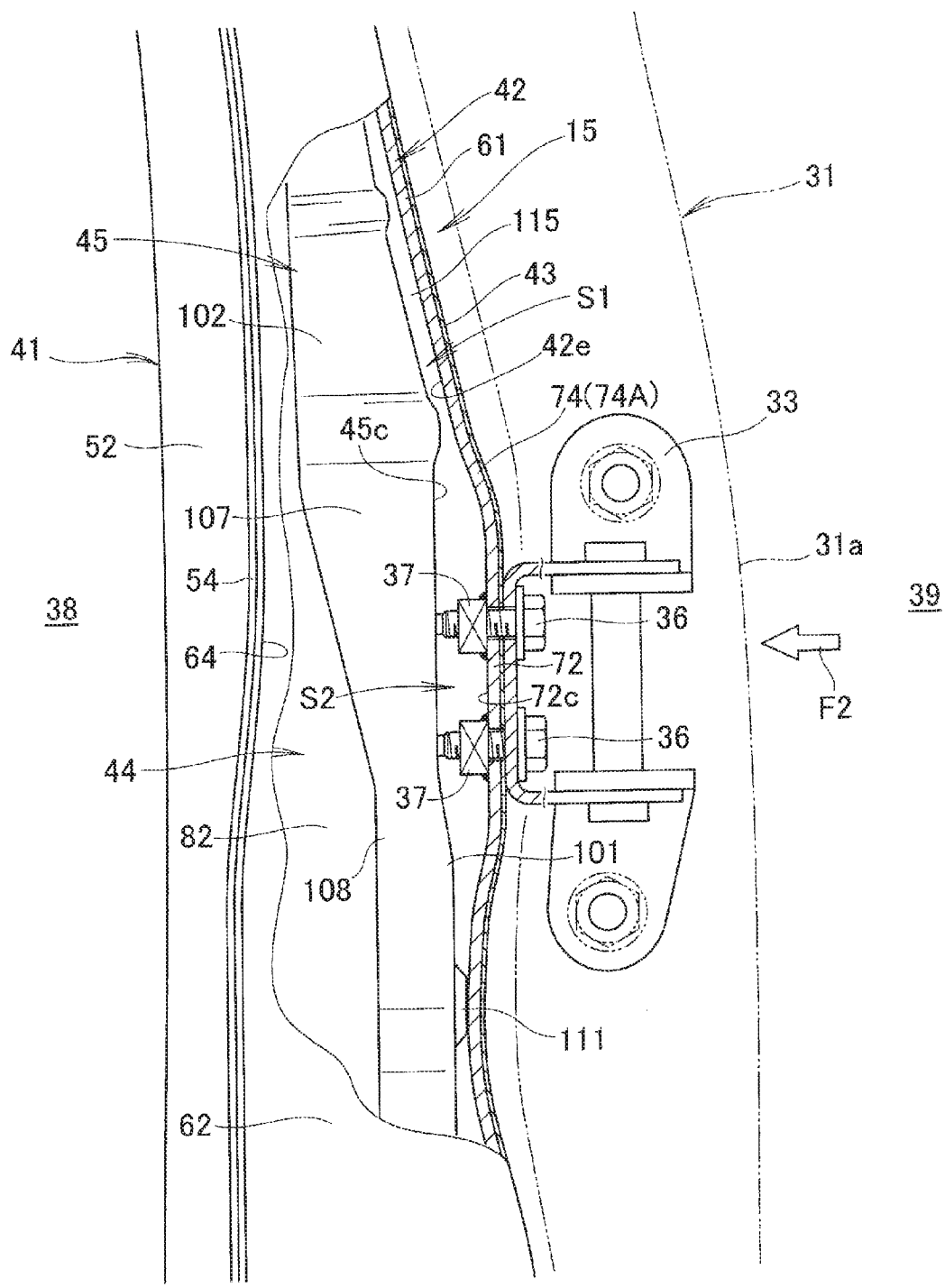
FIG. 4 A front view showing a partially cutout state of the left center pillar shown in FIG. 3.

As shown in FIGS. 3 and 4, an upper door hinge 33 and a lower door hinge 34 are mounted on the left center pillar 15 by bolts 36 and nuts 37.

A front end 31a of the rear side door 31 is mounted on the upper door hinge 33 and the lower door hinge 34. The rear side door 31 is thus pivotally supported by the left center pillar 15 via the upper door hinge 33 and the lower door hinge 34.

Referring back to FIG. 2, the left center pillar 15 includes a pillar inner 41 provided inside in the vehicle width direction (to be referred to as the side of an interior 38 hereinafter), a pillar stiffener 42 joined to the pillar inner 41, a pillar outer 43 joined to the pillar stiffener 42, an inner reinforcing member 44 joined to the pillar inner 41, and a stiffener reinforcing member 45 joined to the pillar stiffener 42.

Figure 5:
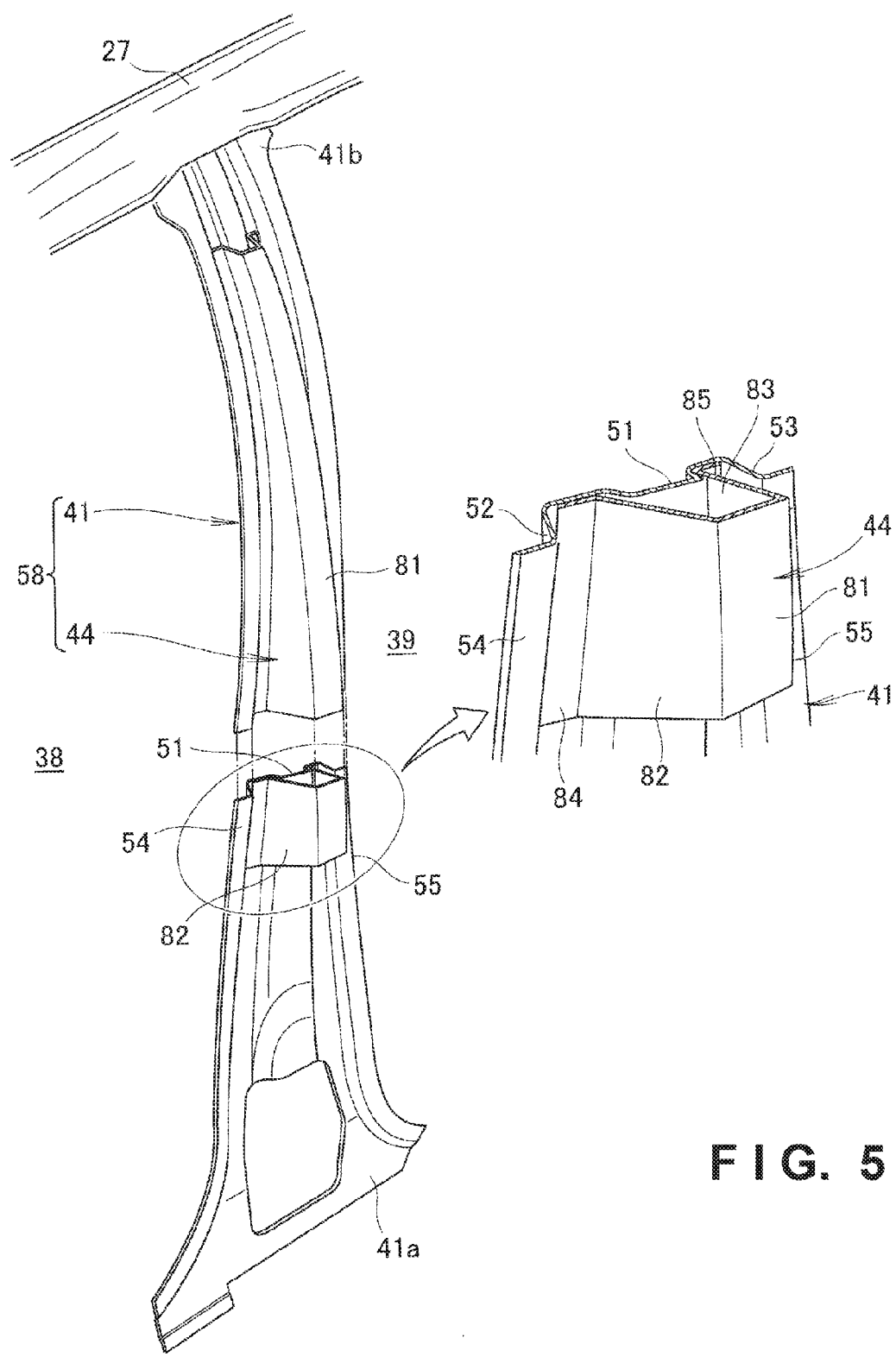
FIG. 5 A perspective view showing an inner assembly portion formed by a pillar inner and an inner reinforcing member shown in FIG. 2.

As shown in FIG. 5, a lower end 41a of the pillar inner 41 is joined to the sill stiffener 24 (see FIG. 2), and an upper end 41b of the pillar inner 41 is joined to the rail inner 27. Hence, the pillar inner 41 extends in the vertical direction while facing the interior 38.

The inner reinforcing member 44 is joined to the pillar inner 41 from outside in the vehicle width direction (to be referred to as the side of an exterior 39 hereinafter).

Figure 6:
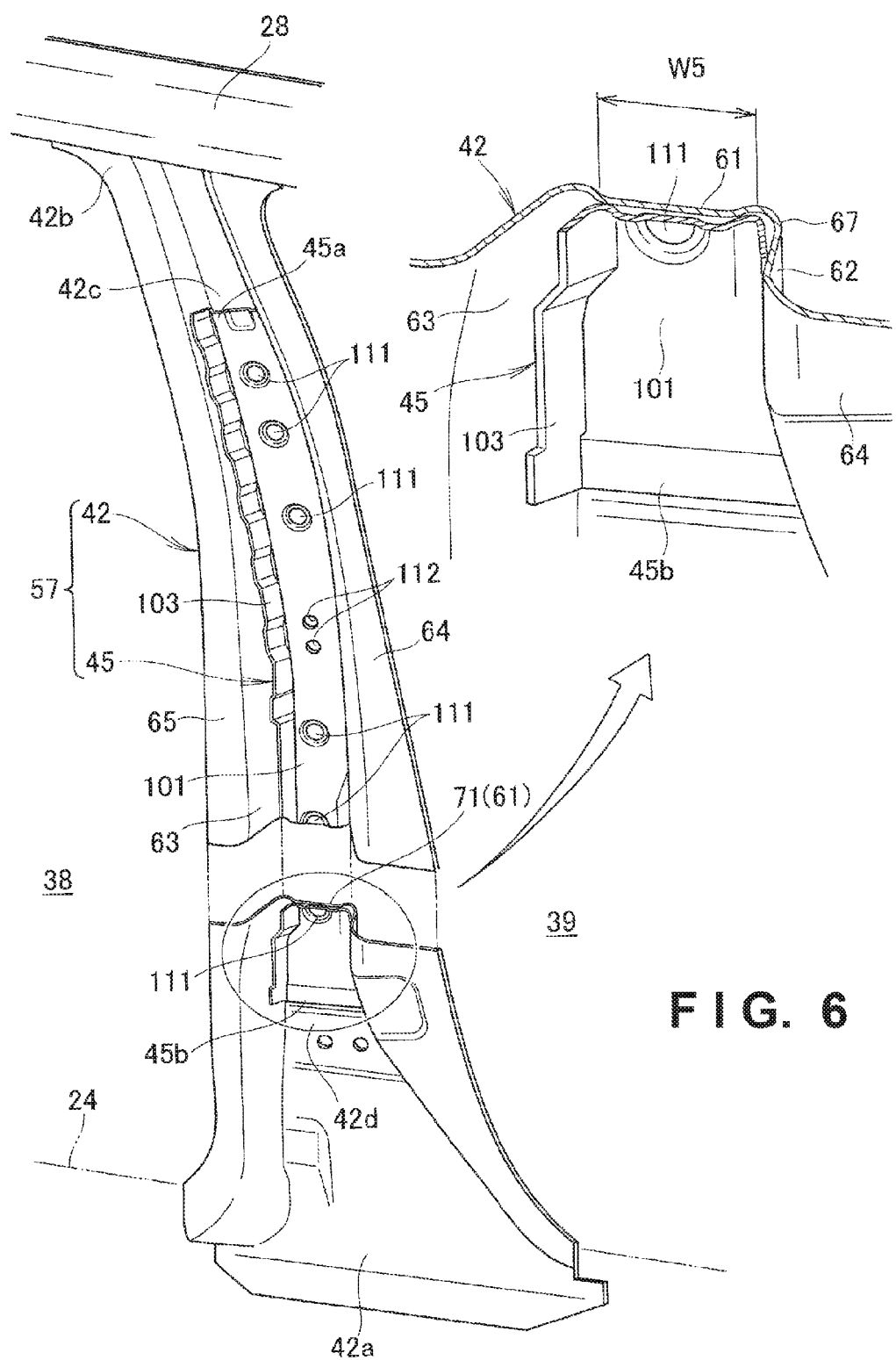
FIG. 6 A perspective view showing an outer assembly portion formed by a pillar stiffener and a stiffener reinforcing member shown in FIG. 2.
Figure 7:
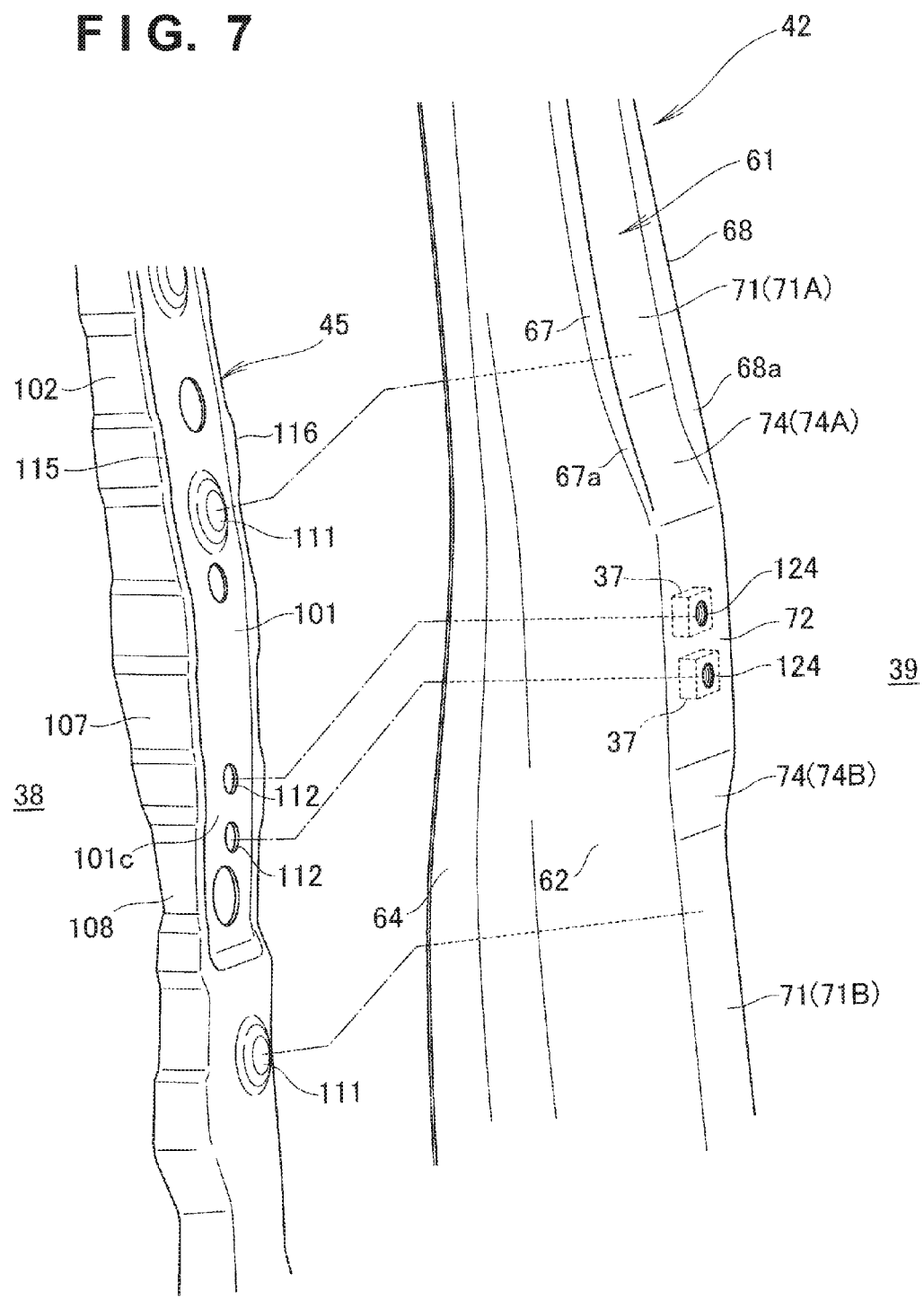
FIG. 7 A perspective view showing a state in which the outer assembly portion shown in FIG. 6 is dismantled into the pillar stiffener and the stiffener reinforcing member.

As shown in FIGS. 6 and 7, a lower end 42a of the pillar stiffener 42 is joined to the sill stiffener 24. An upper end 42b of the pillar stiffener 42 is joined to the rail stiffener 28. Hence, on the side of the exterior 39, the pillar stiffener 42 extends in the vertical direction while facing the pillar inner 41 (see FIG. 2).

The stiffener reinforcing member 45 is joined to the pillar stiffener 42 from the side of the interior 38.

Figure 8:
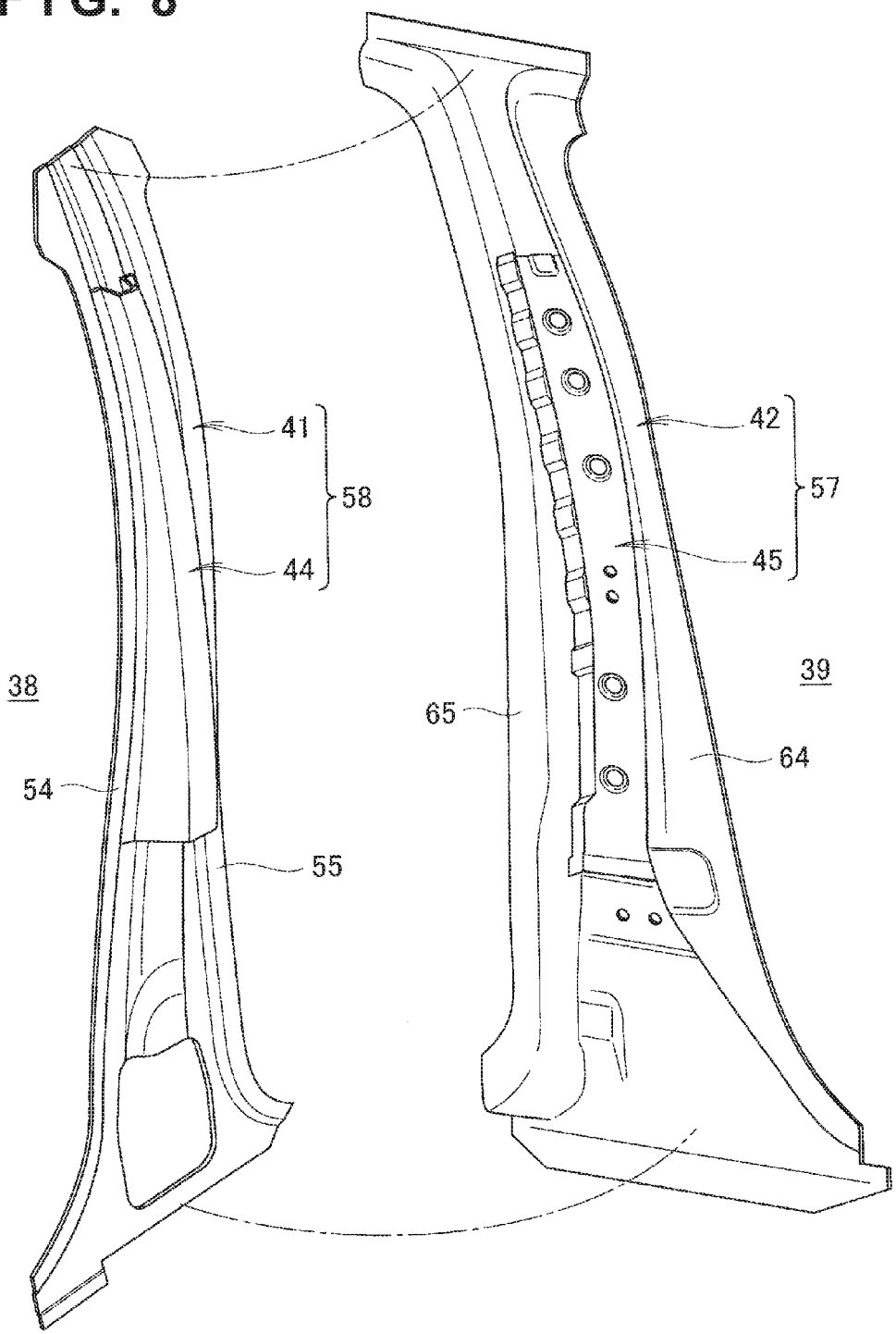
FIG. 8 An exploded perspective view showing the pre-joint state of the outer assembly portion and the inner assembly portion.

As shown in FIG. 8, in a state in which the inner reinforcing member 44 is joined to the pillar inner 41, and the stiffener reinforcing member 45 is joined to the pillar stiffener 42, the pillar stiffener 42 is joined to the pillar inner 41 from the side of the exterior 39.

The inner reinforcing member 44 and the stiffener reinforcing member 45 are thus provided between the pillar inner 41 and the pillar stiffener 42.

As shown in FIG. 2, the pillar outer 43 is joined to the pillar stiffener 42 from the side of the exterior 39. The pillar outer 43 is integrally molded with the sill outer 25, the rail outer 29, and the like. An outer panel 23 is formed by the pillar outer 43, the sill outer 25, the rail outer 29, and the like.

The pillar outer 43 is joined to the pillar stiffener 42 and the pillar inner 41 from the side of the exterior 39. The pillar outer 43 extends in the vertical direction while facing the pillar stiffener 42.

Figure 9:
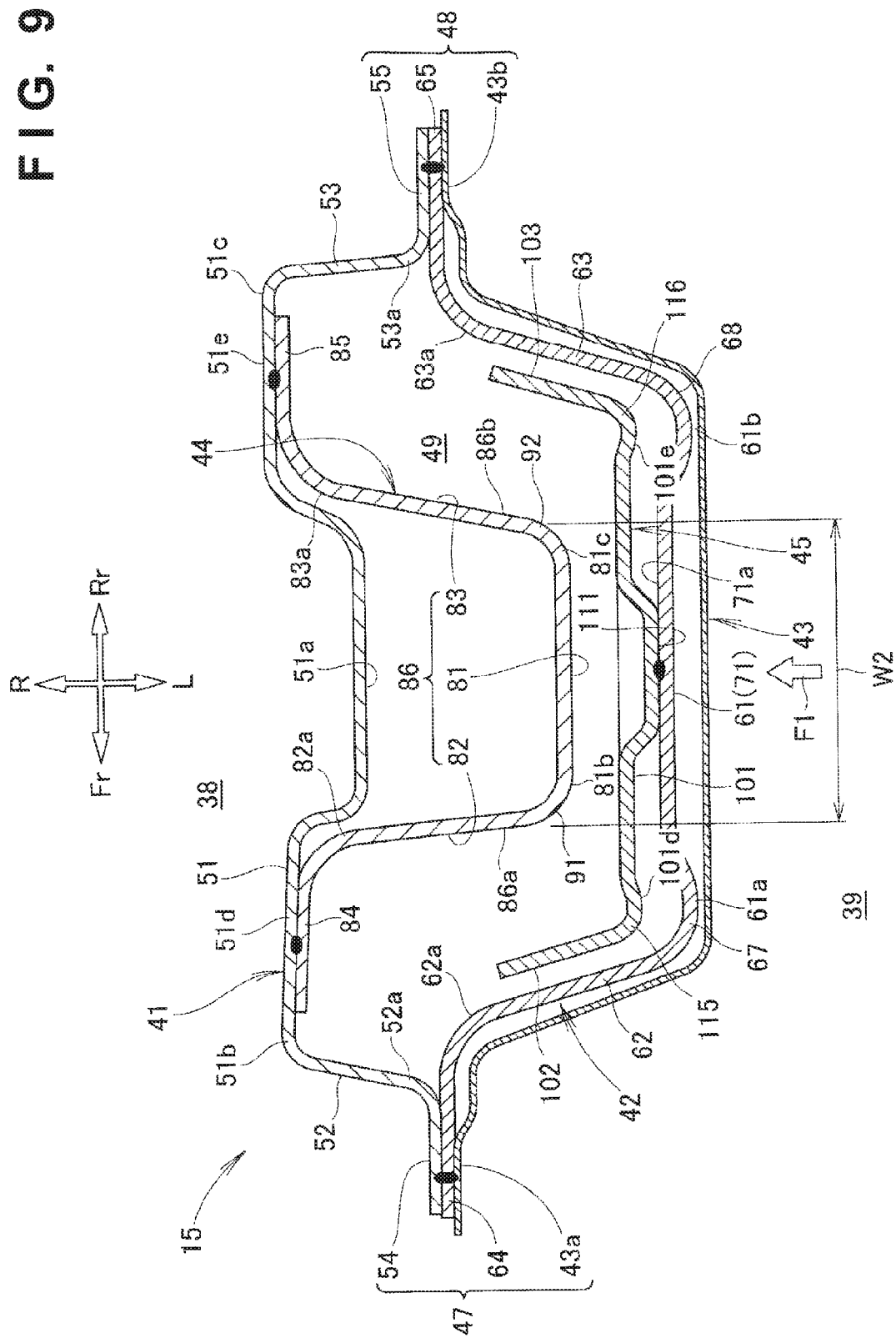
FIG. 9 A sectional view taken along a line 9-9 in FIG. 3.

As shown in FIG. 9, the pillar inner 41 includes an inner inside wall 51, an inner front wall 52, an inner rear wall 53, an inner front flange 54, and an inner rear flange 55.

The inner inside wall 51 is arranged on the side of the interior 38, and includes an inner convex portion 51a at the center in the back-and-forth direction of the vehicle body. The inner convex portion 51a bulges toward the exterior 39. The inner front wall 52 is bent so as to extend from a front end 51b (the end on the body front side) of the inner inside wall 51 toward the exterior 39.

The inner rear wall 53 is bent so as to extend from a rear end 51c (the end on the body rear side) of the inner inside wall 51 toward the exterior 39. The inner front flange 54 is bent so as to extend from an outer end 52a of the inner front wall 52 to the body front side. The inner rear flange 55 is bent so as to extend from an outer end 53a of the inner rear wall 53 to the body rear side.

The pillar inner 41 is formed into a substantially hat-shaped section by the inner inside wall 51, the inner front wall 52, the inner rear wall 53, the inner front flange 54, and the inner rear flange 55. The inner inside wall 51, the inner front wall 52, and the inner rear wall 53 are formed into a substantially U-shaped section. The portions 51, 52, and 53 formed into a substantially U-shaped section bulge toward the interior 38.

The pillar stiffener 42 includes a stiffener outside wall 61, a stiffener front wall 62, a stiffener rear wall 63, a stiffener front flange 64, and a stiffener rear flange 65.

The stiffener outside wall 61 is a portion that forms a wall portion on the side of the exterior 39. The stiffener front wall 62 is bent so as to extend from a front end 61a of the stiffener outside wall 61 toward the interior 38.

The stiffener rear wall 63 is bent so as to extend from a rear end 61b of the stiffener outside wall 61 toward the interior 38. The stiffener front flange 64 is bent so as to extend from an inner end 62a of the stiffener front wall 62 to the body front side. The stiffener rear flange 65 is bent so as to extend from an inner end 63a of the stiffener rear wall 63 to the body rear side.

The pillar stiffener 42 is formed into a substantially hat-shaped section by the stiffener outside wall 61, the stiffener front wall 62, the stiffener rear wall 63, the stiffener front flange 64, and the stiffener rear flange 65. The stiffener outside wall 61, the stiffener front wall 62, and the stiffener rear wall 63 are formed into a substantially U-shaped section. The portions 61, 62, and 63 formed into a substantially U-shaped section bulge toward the exterior 39.

A front ridge line 67 is formed at the front end 61a of the stiffener outside wall 61, and a rear ridge line 68 is formed at the rear end 61b of the stiffener outside wall 61. The front ridge line 67 is a corner portion formed at the front end 61a where the stiffener outside wall 61 and the stiffener front wall 62 intersect so as to project toward the exterior 39.

The rear ridge line 68 is a corner portion formed at the rear end 61b where the stiffener outside wall 61 and the stiffener rear wall 63 intersect so as to project toward the exterior 39.

When the front ridge line 67 and the rear ridge line 68 are formed at the corner portions, the rigidity/strength of the front ridge line 67 and the rear ridge line 68 is kept higher than that of other portions.

The inner front flange 54 of the pillar inner 41, the stiffener front flange 64 of the pillar stiffener 42, and an outer front flange 43a of the pillar outer 43 are joined by spot welding. A front flange joint 47 is formed by the joined front flanges 54, 64, and 43a.

The inner rear flange 55 of the pillar inner 41, the stiffener rear flange 65 of the pillar stiffener 42, and an outer rear flange 43b of the pillar outer 43 are joined by spot welding. A rear flange joint 48 is formed by the joined rear flanges 55, 65, and 43b.

The front flanges 54, 64, and 43a are joined, and the rear flanges 55, 65, and 43b are joined, thereby integrally joining the pillar inner 41, the pillar stiffener 42, and the pillar outer 43. In this state, a hollow closed section 49 (to be referred to as "pillar closed section" hereinafter) with an almost rectangular shape is formed between the pillar inner 41 and the pillar stiffener 42.

Referring back to FIG. 2, general surfaces 71, an upper hinge mount surface 72, a lower hinge mount surface 73, and continuous surfaces 74 are formed on the stiffener outside wall 61 of the pillar stiffener 42.

The upper hinge mount surface 72 and the lower hinge mount surface 73 are portions of a similar shape. The upper hinge mount surface 72 will be described below, and a description of the lower hinge mount surface 73 will be omitted.

Figure 10:
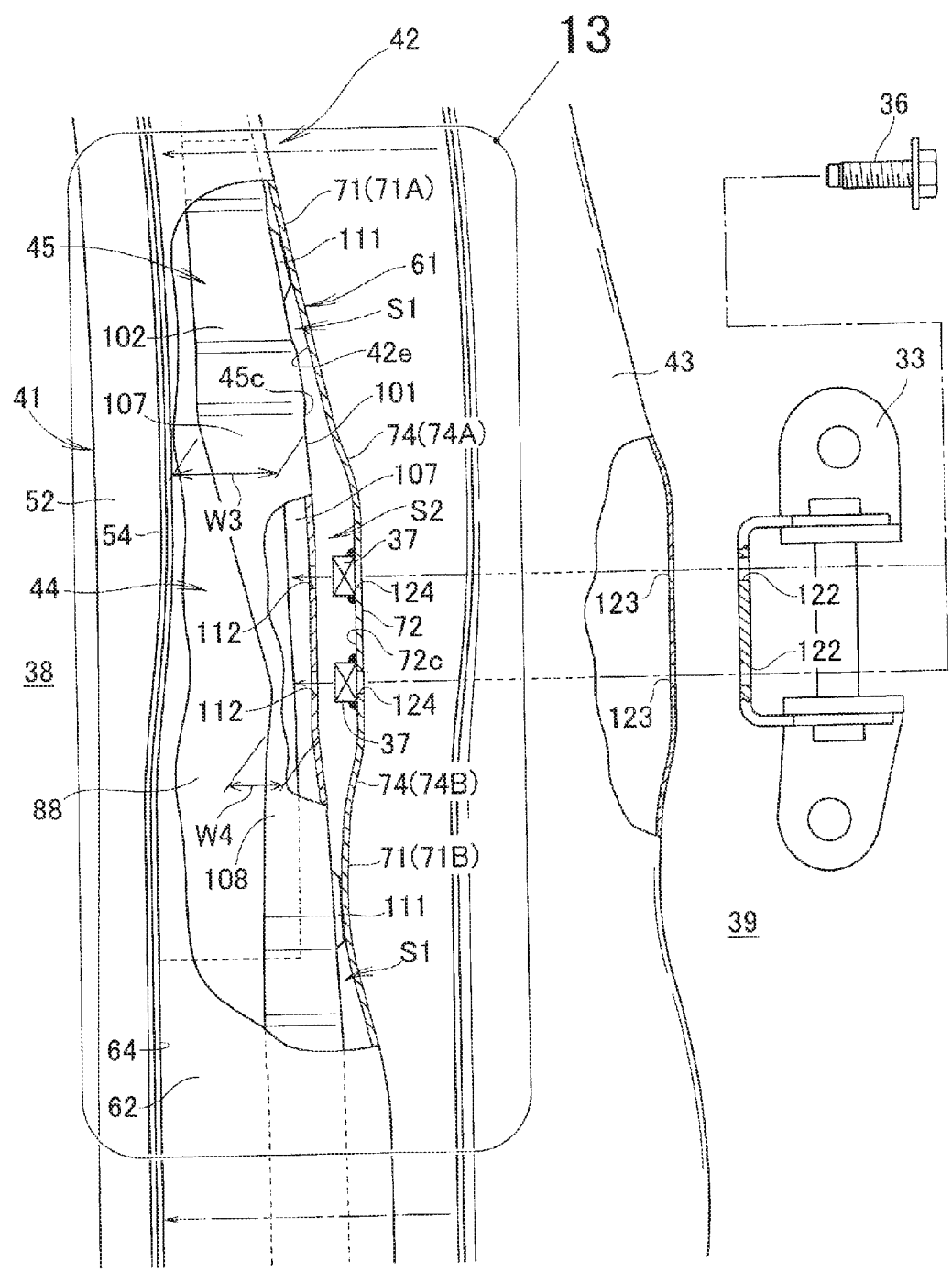
FIG. 10 A front view showing a state in which the left center pillar shown in FIG. 4 is dismantled.

As shown in FIGS. 7 and 10, the general surfaces 71 are portions arranged on the side of the exterior 39 at a predetermined interval S1 with respect to a stiffener reinforcing outside wall 101 of the stiffener reinforcing member 45 and extending in the vertical direction.

The upper hinge mount surface 72 is a portion bulging toward the exterior 39 with respect to the general surfaces 71 and extending in the vertical direction. The upper door hinge 33 is mounted on the upper hinge mount surface 72. The rear side door 31 (see FIG. 1) is supported by the upper hinge mount surface 72 via the upper door hinge 33.

The continuous surfaces 74 are portions continuously obliquely extending between the upper hinge mount surface 72 and the general surfaces 71.

As shown in FIG. 9, the inner reinforcing member 44 includes an inner reinforcing outside wall 81, an inner reinforcing front wall 82, an inner reinforcing rear wall 83, an inner reinforcing front flange 84, and an inner reinforcing rear flange 85. The inner reinforcing member 44 is arranged in the pillar closed section 49 between the pillar inner 41 and the pillar stiffener 42.

The inner reinforcing outside wall 81 is arranged on the side of the exterior 39 with respect to the inner inside wall 51 and on the side of the interior 38 with respect to the stiffener reinforcing member 45 (more specifically, the stiffener reinforcing outside wall 101).

Figure 11:
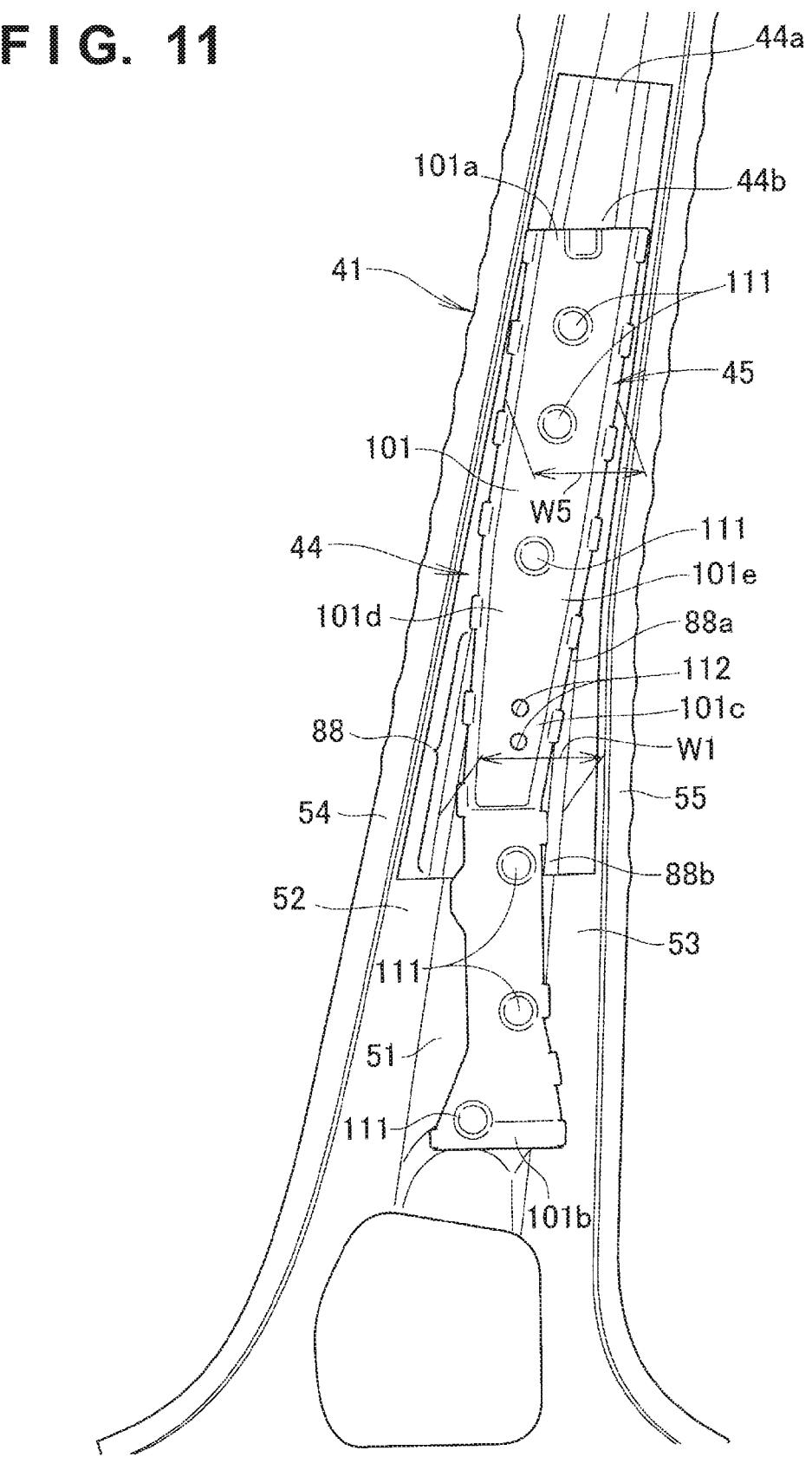
FIG. 11 A side view showing a state in which the stiffener reinforcing member is overlaid on the inner assembly portion shown in FIG. 5.
Figure 12:
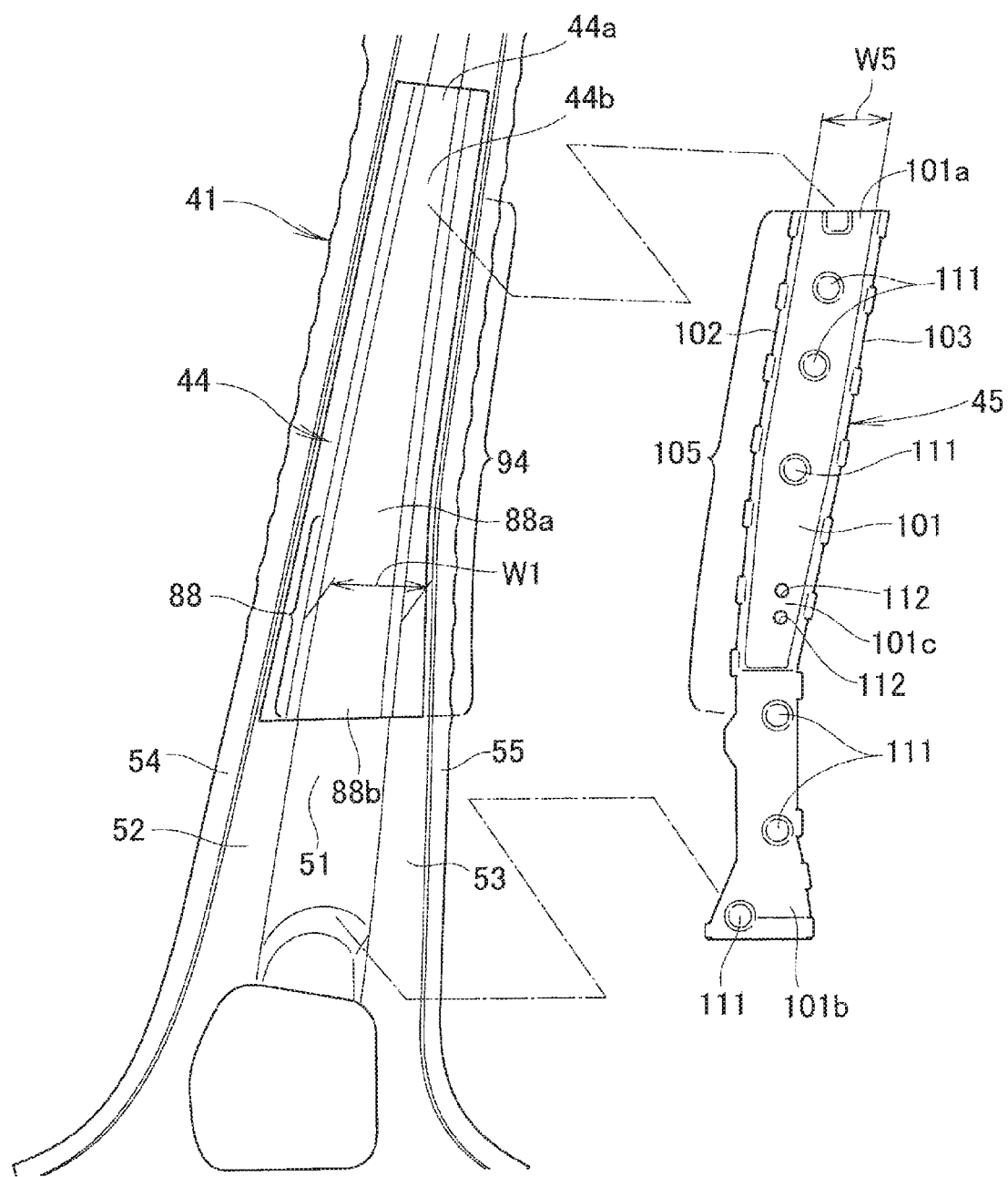
FIG. 12 A side view showing a state in which the stiffener reinforcing member is separated from the inner assembly portion shown in FIG. 11.

As shown in FIGS. 11 and 12, the inner reinforcing member 44 extends in the vertical direction along the pillar inner 41, and includes an inner reinforcing section enlarging portion 88 on the lower side. The inner reinforcing section enlarging portion 88 is formed to increase a width W1 in the back-and-forth direction of the vehicle body from an upper end 88a to a lower end 88b.

Referring back to FIG. 9, the inner reinforcing front wall 82 is bent so as to extend from a front end 81b (the end on the body front side) of the inner reinforcing outside wall 81 inward in the vehicle width direction. The inner reinforcing rear wall 83 is bent so as to extend from a rear end 81c (the end on the body rear side) of the inner reinforcing outside wall 81 inward in the vehicle width direction.

The inner reinforcing front flange 84 is bent so as to extend from an inner end 82a of the inner reinforcing front wall 82 to the body front side. The inner reinforcing rear flange 85 is bent so as to extend from an inner end 83a of the inner reinforcing rear wall 83 to the body rear side.

The inner reinforcing member 44 is formed into a substantially hat-shaped section by the inner reinforcing outside wall 81, the inner reinforcing front wall 82, the inner reinforcing rear wall 83, the inner reinforcing front flange 84, and the inner reinforcing rear flange 85. The inner reinforcing outside wall 81, the inner reinforcing front wall 82, and the inner reinforcing rear wall 83 are formed into a substantially U-shaped section. The portions 81, 82, and 83 formed into a substantially U-shaped section bulge toward the exterior 39. The portions 81, 82, and 83 formed into a substantially U-shaped section will be referred to as a U-shaped section portion 86 hereinafter.

A front ridge line 91 is formed at the front end 81b of the inner reinforcing outside wall 81, and a rear ridge line 92 is formed at the rear end 81c of the inner reinforcing outside wall 81. The front ridge line 91 is a corner portion formed at the front end 81b where the inner reinforcing outside wall 81 and the inner reinforcing front wall 82 intersect so as to project toward the exterior 39.

The rear ridge line 92 is a corner portion formed at the rear end 81c where the inner reinforcing outside wall 81 and the inner reinforcing rear wall 83 intersect so as to project toward the exterior 39.

When the front ridge line 91 and the rear ridge line 92 are formed at the corner portions, the rigidity/strength of the front ridge line 91 and the rear ridge line 92 is kept higher than that of other portions.

The inner reinforcing front flange 84 is joined by spot welding to a front portion 51d on the body front side of the inner convex portion 51a out of the inner inside wall 51. The inner reinforcing rear flange 85 is joined by spot welding to a rear portion 51e on the body rear side of the inner convex portion 51a out of the inner inside wall 51.

The inner reinforcing member 44 is thus welded to the pillar inner 41 from the side of the exterior 39.

In this way, the pillar closed section 49 is formed between the pillar inner 41 and the pillar stiffener 42, and the inner reinforcing member 44 is arranged in the pillar closed section 49. In addition, the inner reinforcing front flange 84 and the inner reinforcing rear flange 85 of the inner reinforcing member 44 are joined to the inner inside wall 51 of the pillar inner 41.

In this state, the U-shaped section portion 86 of the inner reinforcing member 44 bulges toward the exterior 39 (that is, toward the stiffener reinforcing member 45).

The inner inside wall 51 is formed inside the inner front flange 54 and the inner rear flange 55. Hence, when the inner reinforcing front flange 84 and the inner reinforcing rear flange 85 are joined to the inner inside wall 51, a width W2 of the inner reinforcing outside wall 81 in the back-and-forth direction of the vehicle body is suppressed small.

In the pillar closed section 49, the stiffener reinforcing member 45 that is a structure independent of the inner reinforcing member 44 is arranged. The stiffener reinforcing member 45 is joined to the stiffener outside wall 61 of the pillar stiffener 42 from the side of the interior 38.

In this state, the stiffener reinforcing member 45 extends in the vertical direction on the side of the exterior 39 with respect to the inner reinforcing member 44 (see FIG. 11).

As shown in FIGS. 11 and 12, the stiffener reinforcing member 45 extends from a portion 44b on the lower side of an upper end 44a of the inner reinforcing member 44 to the lower side of the lower end (that is, the lower end of the inner reinforcing section enlarging portion 88) 88b of the inner reinforcing member 44.

An overlap portion 105 of the stiffener reinforcing member 45 is thus arranged to be overlaid on an overlap portion 94 of the inner reinforcing member 44 in the vehicle width direction.

As shown in FIG. 10, the stiffener reinforcing member 45 includes projection enlarging portions 107 facing the continuous surface 74 on the upper side of the upper hinge mount surface 72 of the pillar stiffener 42, and projection reducing portions 108 facing the inner reinforcing section enlarging portion 88.

Each projection enlarging portion 107 is provided at a portion of the stiffener reinforcing member 45 facing the continuous surface 74 and formed to have a large projection width W3. Each projection reducing portion 108 is provided at a portion facing the inner reinforcing section enlarging portion 88 and formed to have a small projection width W4.

Referring back to FIGS. 11 and 12, the stiffener reinforcing outside wall 101 of the stiffener reinforcing member 45 is formed such that a width W5 becomes almost constant from the upper side to the lower side.

As shown in FIG. 9, the stiffener reinforcing member 45 includes the stiffener reinforcing outside wall 101, a stiffener reinforcing front wall 102, and a stiffener reinforcing rear wall 103.

The stiffener reinforcing outside wall 101 is arranged on the side of the exterior 39 with respect to the inner reinforcing outside wall 81 of the inner reinforcing member 44 and on the side of the interior 38 with respect to the stiffener outside wall 61 of the pillar stiffener 42.

As shown in FIGS. 10 and 11, the stiffener reinforcing outside wall 101 includes a plurality of joints 111 formed in the vertical direction at intervals between an upper end 101a and an lower end 101b, and through holes 112 formed in vicinity 101c of the center lower portion.

The nuts 37 used to mount the upper door hinge 33 on the pillar stiffener 42 are provided so as to face the vicinity 101c of the center lower portion. The nuts 37 are mounted on the upper hinge mount surface 72.

The through holes 112 are formed in the vicinity 101c of the center lower portion, and the bolts 36 threadably engaging with the nuts 37 are thus inserted into the through holes 112. It is therefore possible to avoid the bolts 36 from interfering with the vicinity 101c of the center lower portion of the stiffener reinforcing outside wall 101.

Referring back to FIG. 9, the stiffener reinforcing front wall 102 is bent so as to extend from a front end (the end on the body front side) 101d of the stiffener reinforcing outside wall 101 toward the interior 38. The stiffener reinforcing rear wall 103 is bent so as to extend from a rear end (the end on the body rear side) 101e of the stiffener reinforcing outside wall 101 toward the interior 38.

The stiffener reinforcing outside wall 101, the stiffener reinforcing front wall 102, and the stiffener reinforcing rear wall 103 are formed into a substantially U-shaped section. The portions 101, 102, and 103 formed into a substantially U-shaped section bulge toward the exterior 39.

The joints 111 of the stiffener reinforcing outside wall 101 are joined to reverse surfaces 71a of the general surfaces 71 of the stiffener outside wall 61.

A front ridge line 115 is formed at the front end 101d of the stiffener reinforcing outside wall 101, and a rear ridge line 116 is formed at the rear end 101e of the stiffener reinforcing outside wall 101. The front ridge line 115 is a corner portion formed at the front end 101d where the stiffener reinforcing outside wall 101 and the stiffener reinforcing front wall 102 intersect so as to project toward the exterior 39.

The rear ridge line 116 is a corner portion formed at the rear end 101e where the stiffener reinforcing outside wall 101 and the stiffener reinforcing rear wall 103 intersect so as to project toward the exterior 39.

When the front ridge line 115 and the rear ridge line 116 are formed at the corner portions, the rigidity/strength of the front ridge line 115 and the rear ridge line 116 is kept higher than that of other portions.

As shown in FIGS. 6 and 10, the plurality of joints 111 of the stiffener reinforcing outside wall 101 are formed in the vertical direction at intervals so as to face the general surfaces 71 of the stiffener outside wall 61.

Hence, when the plurality of joints 111 are joined to the general surfaces 71, the stiffener reinforcing member 45 is joined to the pillar stiffener 42 from the side of the interior 38 and extends in the vertical direction along the pillar stiffener 42.

In this state, an upper end 45a of the stiffener reinforcing member 45 is arranged in vicinity 42c of the upper end of the pillar stiffener 42. In addition, a lower end 45b of the stiffener reinforcing member 45 is arranged on a lower portion 42d of the upper hinge mount surface 72.

As shown in FIG. 9, if an impact load F1 is input to the left center pillar 15 from the side of the exterior 39, part of the input impact load F1 is transmitted to the front flange joint 47 and the rear flange joint 48 of the left center pillar 15.

The pillar stiffener 42 and the stiffener reinforcing member 45 are deformed toward the interior 38 by the remaining load. When the pillar stiffener 42 and the stiffener reinforcing member 45 are deformed, the stiffener reinforcing member 45 hits the U-shaped section portion 86 of the inner reinforcing member 44.

The left center pillar 15 is arranged such that the stiffener reinforcing member 45 overlaps the inner reinforcing member 44 in the vehicle width direction. Hence, the remaining load can quickly be transmitted to the inner inside wall 51 via the stiffener reinforcing member 45 and the U-shaped section portion 86.

The input impact load F1 can thus quickly be distributed to the front flange joint 47, the rear flange joint 48, and the inner inside wall 51.

The inner reinforcing member 44 is formed into a substantially hat-shaped section, and the inner reinforcing front flange 84 and the inner reinforcing rear flange 85 of the inner reinforcing member 44 are joined to the inner inside wall 51 of the pillar inner 41. Hence, the front and rear flanges 84 and 85 are located inside the inner front flange 54 and the inner rear flange 55. For this reason, the width W2 of the inner reinforcing member 44 (more specifically, the inner reinforcing outside wall 81) in the back-and-forth direction of the vehicle body is suppressed to be small.

It is therefore difficult to make the front ridge line 91 of the inner reinforcing member 44 close to the front ridge line 67 of the pillar stiffener 42 or make the rear ridge line 92 of the inner reinforcing member 44 close to the rear ridge line 68 of the pillar stiffener 42.

For this reason, if the impact load F1 is input to the left center pillar 15 from the side of the exterior 39, it is difficult to quickly transmit the input impact load F1 to the front ridge line 91 or the rear ridge line 92 of the inner reinforcing member 44 and support.

As a measure, the stiffener reinforcing member 45 is caused to intervene between the pillar stiffener 42 and the inner reinforcing member 44 such that they overlap in the vehicle width direction. It is therefore possible to make the front ridge line 115 of the stiffener reinforcing member 45 close to the front ridge line 67 of the pillar stiffener 42 or the front ridge line 91 of the inner reinforcing outside wall 81. It is also possible to make rear ridge line 116 of the stiffener reinforcing member 45 close to the rear ridge line 68 of the pillar stiffener 42 or the rear ridge line 92 of the inner reinforcing outside wall 81.

Accordingly, the impact load F1 input to the pillar stiffener 42 of the left center pillar 15 can quickly be supported by the front ridge line 115 and the rear ridge line 116 of the stiffener reinforcing member 45 or the front ridge line 91 and the rear ridge line 92 of the inner reinforcing outside wall 81. It is therefore possible to raise the rigidity/strength of the left center pillar 15 to the impact load F1.

When the stiffener reinforcing member 45 is joined to the pillar stiffener 42 on the side of the interior 38, as shown in FIG. 6, the two members 42 and 45 are integrally joined as an outer assembly portion 57.

In addition, when the inner reinforcing member 44 is joined to the pillar inner 41 on the side of the exterior 39, as shown in FIG. 5, the two members 41 and 44 are integrally joined as an inner assembly portion 58.

In this state, the pillar stiffener 42 of the outer assembly portion 57 and the pillar inner 41 of the inner assembly portion 58 are joined, as shown in FIG. 8. More specifically, as shown in FIG. 9, the stiffener front flange 64 of the pillar stiffener 42 and the inner front flange 54 of the pillar inner 41 are joined. In addition, the stiffener rear flange 65 of the pillar stiffener 42 and the inner rear flange 55 of the pillar inner 41 are joined.

In this state, the inner reinforcing member 44 and the stiffener reinforcing member 45 are stored in the pillar closed section 49 between the pillar stiffener 42 and the pillar inner 41.

Hence, after the pillar closed section 49 is formed by joining the pillar stiffener 42 and the pillar inner 41, the stiffener reinforcing member 45 or the inner reinforcing member 44 need not be joined in the pillar closed section 49 by spot welding or the like.

Accordingly, an insertion hole used to insert a spot gun for spot welding into the pillar closed section 49 can be obviated from the pillar stiffener 42 or the pillar inner 41, and the rigidity/strength of the left center pillar 15 can be ensured.

Figure 13:
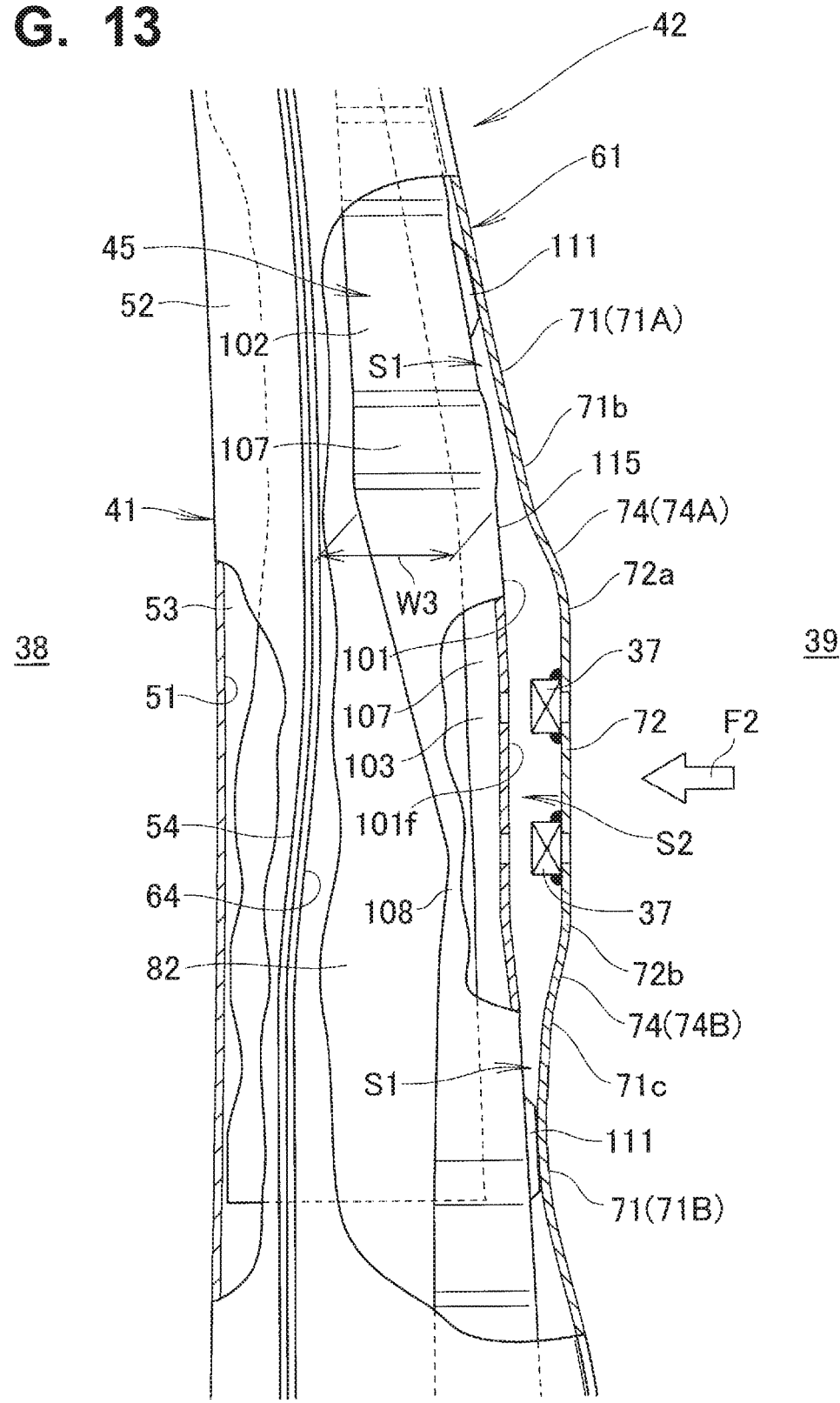
FIG. 13 An enlarged view of a portion 13 in FIG. 10.

As shown in FIG. 13, the general surfaces 71 are formed on the upper and lower sides of the upper hinge mount surface 72 on the stiffener outside wall 61. In addition, the continuous surfaces 74 intervene between the upper hinge mount surface 72 and the general surfaces 71.

To facilitate understanding of the structure of the left center pillar 15, the general surface 71 on the upper side will be explained as an upper general surface 71A, and the general surface 71 on the lower side will be explained as a lower general surface 71B hereinafter. In addition, the continuous surface 74 on the upper side will be explained as an upper continuous surface 74A, and the continuous surface 74 on the lower surface will be explained as a lower continuous surface 74B.

A lower end 71b of the upper general surface 71A continues to an upper end 72a of the upper hinge mount surface 72 via the upper continuous surface 74A. The upper continuous surface 74A tilts outward in the vehicle width direction from the lower end 71b of the upper general surface 71A to the upper end 72a of the upper hinge mount surface 72.

An upper end 71c of the lower general surface 71B continues to a lower end 72b of the upper hinge mount surface 72 via the lower continuous surface 74B. The lower continuous surface 74B tilts outward in the vehicle width direction from the upper end 71c of the lower general surface 71B to the lower end 72b of the upper hinge mount surface 72.

The joints 111 of the stiffener reinforcing outside wall 101 are joined to the upper general surface 71A, and the joints 111 of the stiffener reinforcing outside wall 101 are joined to the lower general surface 71B.

In this state, the upper general surface 71A and the lower general surface 71B are arranged at the predetermined interval S1 with respect to the stiffener reinforcing outside wall 101. In addition, the upper hinge mount surface 72 is arranged at a gap S2 larger than the predetermined interval S1 with respect to the stiffener reinforcing outside wall 101.

Hence, a portion 101f facing the upper hinge mount surface 72 out of the stiffener reinforcing outside wall 101 need not bulge toward the exterior 39 along the upper hinge mount surface 72 of the stiffener outside wall 61.

Accordingly, the front ridge line 115 and the rear ridge line 116 (see FIG. 7) of the stiffener reinforcing member 45 can be extended on an almost straight line in the vertical direction, and the rigidity can be ensured all over the ridge lines 115 and 116. It is therefore possible to ensure the rigidity/strength of the stiffener reinforcing member 45 and the left center pillar 15 (see FIG. 3).

As shown in FIGS. 4 and 10, to coat opposing surfaces 42e and 45c of the pillar stiffener 42 and the stiffener reinforcing member 45 with an electrodeposition coating solution, the predetermined interval S1 and the gap S2 are formed between the pillar stiffener 42 and the stiffener reinforcing member 45.

Hence, when the upper door hinge 33 is fastened to the pillar stiffener 42 and the stiffener reinforcing member 45 by the bolts 36 and the nuts 37, the gap S2 intervenes between the bolts 36 and the nuts 37. It is therefore difficult to ensure the tightening torque of the bolts 36 within a predetermined range and manage the tightening torque.

As a measure, the nuts 37 are arranged in the gap S2 between the upper hinge mount surface 72 and the stiffener reinforcing outside wall 101 and mounted on a reverse surface 72c (that is, the surface on the side of the interior 38) of the upper hinge mount surface 72 by welding.

The bolts 36 are inserted into mount holes 122 of the upper door hinge 33, mount holes 123 of the pillar outer 43, and mount holes 124 of the upper hinge mount surface 72. The bolts 36 inserted into the mount holes 122, 123, and 124 threadably engage with the nuts 37.

The upper door hinge 33 is thus mounted on the pillar outer 43 and the upper hinge mount surface 72 by the bolts 36 and the nuts 37.

In this state, the stiffener reinforcing member 45 need not intervene between the bolts 36 and the nuts 37. It is therefore possible to mount the upper door hinge 33 to the pillar outer 43 and the upper hinge mount surface 72 without intervention of the gap S2 between the bolts 36 and the nuts 37.

This can prevent the tightening torque of the bolts 36 from being affected by the gap S2 between the upper hinge mount surface 72 and the stiffener reinforcing outside wall 101. Hence, when mounting the upper door hinge 33 on the upper hinge mount surface 72, the tightening torque of the bolts 36 can be ensured within a predetermined range and easily managed.

Figure 14:
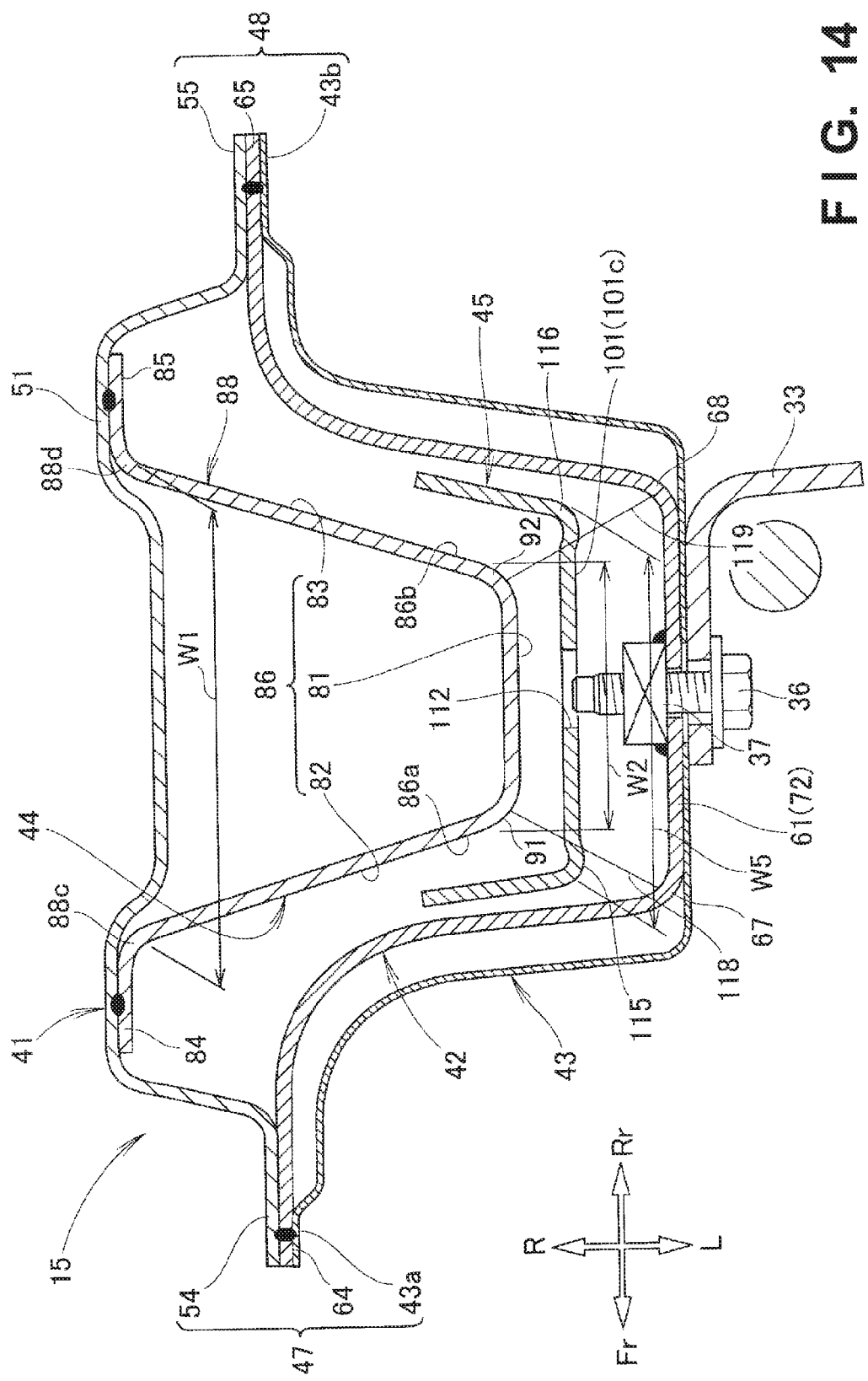
FIG. 14 A sectional view taken along a line 14-14 in FIG. 3.

As shown in FIG. 14, the through hole 112 is formed in the vicinity 101c of center lower portion (also see FIG. 7) facing the nut 37 out of the stiffener reinforcing outside wall 101. Hence, the bolt 36 threadably engaging with the nut 37 is inserted into the through hole 112.

The bolts 36 can thus be avoided from hitting the vicinity 101c of center lower portion of the stiffener reinforcing outside wall 101, and the tightening torque of the bolts 36 can more easily be ensured within a predetermined range.

The stiffener reinforcing member 45 is formed into a substantially U-shaped section, and the U-shaped section portion 86 of the inner reinforcing member 44 is arranged in the section of the stiffener reinforcing member 45.

More specifically, the portions of the U-shaped section portion 86 on the side the exterior 39 (that is, the inner reinforcing outside wall 81 and a front outer end 86a and a rear outer end 86b of the U-shaped section portion 86) are arranged in the section of the stiffener reinforcing member 45 (also see FIG. 9).

As shown in FIG. 12, the inner reinforcing member 44 includes the inner reinforcing section enlarging portion 88 on the lower side. The inner reinforcing section enlarging portion 88 is formed to increase the width W1 (also see FIG. 14) in the back-and-forth direction of the vehicle body from the upper end 88a to the lower end 88b.

The width W1 is the size between a front base 88c and a rear base 88d of the inner reinforcing section enlarging portion 88 in the back-and-forth direction of the vehicle body.

On the other hand, as shown in FIGS. 6 and 12, the stiffener reinforcing outside wall 101 of the stiffener reinforcing member 45 is formed such that the width W5 becomes almost constant from the upper side to the lower side. The stiffener outside wall 61 of the pillar stiffener 42 is also formed to be almost constant from the upper side to the lower side.

Hence, the stiffener reinforcing member 45 can suitably be joined along the pillar stiffener 42.

Figure 15:
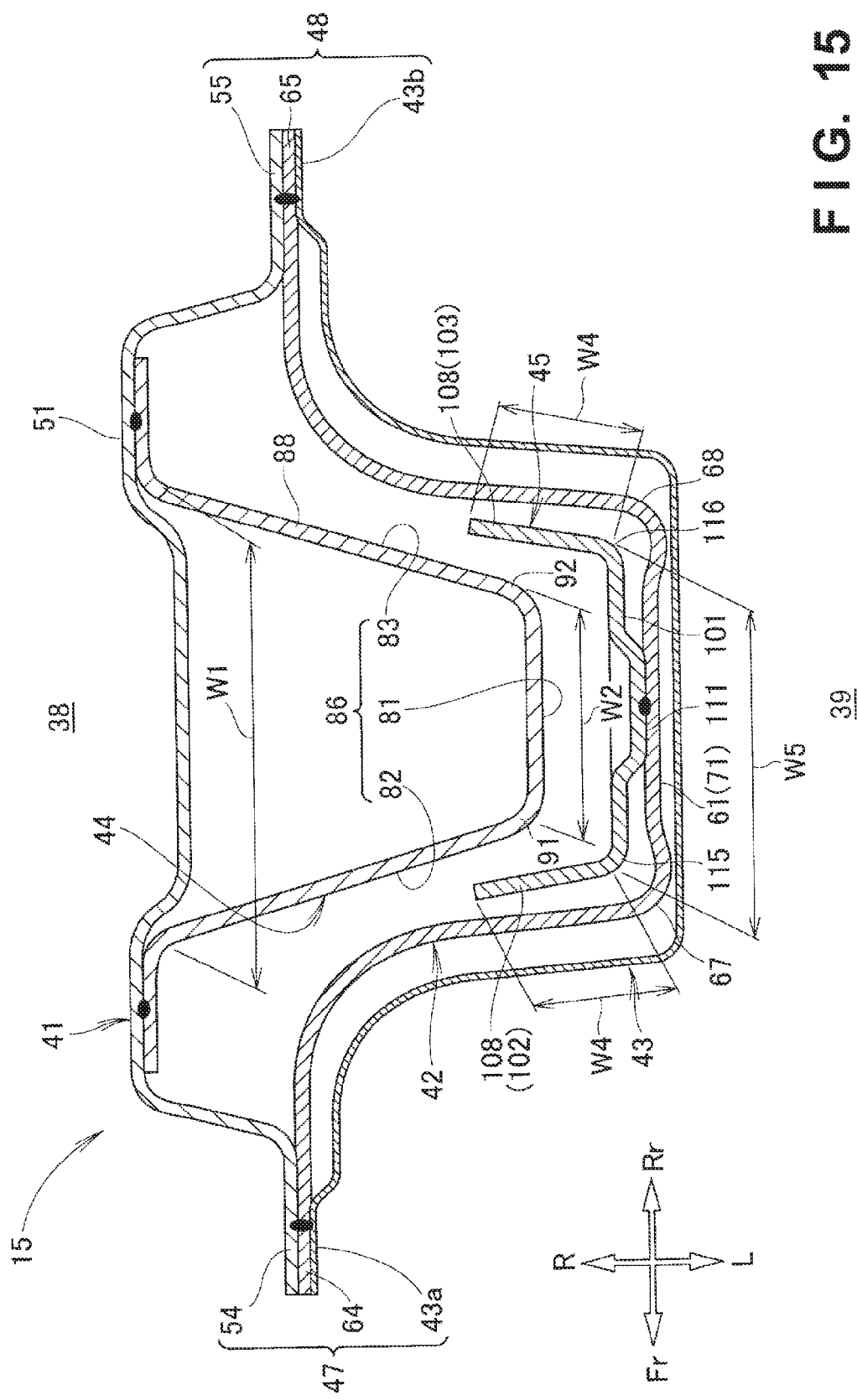
FIG. 15 A sectional view taken along a line 15-15 in FIG. 3.

As shown in FIG. 15, the width W1 of the inner reinforcing section enlarging portion 88 increases downward, and the width W5 of the stiffener reinforcing member 45 is almost constant. Hence, the width W1 of the inner reinforcing section enlarging portion 88 become larger than the width W5 of the stiffener reinforcing member 45.

For this reason, the stiffener reinforcing member 45 may hit the inner reinforcing section enlarging portion 88. To prevent this, the projection reducing portions 108 are provided at portions facing the inner reinforcing section enlarging portion 88 out of the stiffener reinforcing member 45.

More specifically, the projection reducing portion 108 is provided on the stiffener reinforcing front wall 102 of the stiffener reinforcing member 45, and the projection reducing portion 108 is provided on the stiffener reinforcing rear wall 103. The projection width W4 of each projection reducing portion 108 is formed to be smaller than those of other portions of the stiffener reinforcing front wall 102 or the stiffener reinforcing rear wall 103 (also see FIG. 10).

The width W2 of the inner reinforcing outside wall 81 of the U-shaped section portion 86 of the inner reinforcing member 44 is smaller than the width W5 of the stiffener reinforcing member 45. The portions of the U-shaped section portion 86 on the side the exterior 39 (that is, the inner reinforcing outside wall 81 and the front outer end 86a and the rear outer end 86b of the U-shaped section portion 86) are arranged in the section of the stiffener reinforcing member 45.

In this state, the projection reducing portions 108 each formed to have the small projection width W4 can be prevented from hitting the inner reinforcing front wall 82 or the inner reinforcing rear wall 83 of the U-shaped section portion 86. This can increase the degree of freedom of design when determining the shapes of the stiffener reinforcing member 45 and the inner reinforcing member 44 (more specifically, the widths W1 and W2).

In addition, the projection width W4 is made small only for the projection reducing portions 108 out of the stiffener reinforcing front wall 102 and the stiffener reinforcing rear wall 103. Hence, the projection width can be increased almost all over the stiffener reinforcing member 45 (also see FIG. 10).

The sectional shape can be made large almost all over the stiffener reinforcing member 45, and the rigidity/strength of the stiffener reinforcing member 45 (that is, the left center pillar 15) can sufficiently be ensured.

Referring back to FIGS. 7 and 13, the upper hinge mount surface 72 of the stiffener outside wall 61 bulges toward the exterior 39, and the upper hinge mount surface 72 and the upper general surface 71A continue via the upper continuous surface 74A. Hence, a portion 67a corresponding to the upper continuous surface 74A out of the front ridge line 67 of the stiffener outside wall 61 extends to tilt with respect to the vertical direction. In addition, a portion 68a corresponding to the upper continuous surface 74A out of the rear ridge line 68 of the stiffener outside wall 61 extends to tilt with respect to the vertical direction.

For this reason, the rigidity/strength of the continuous surface 74 is assumed to be lower than that of other portions of the general surfaces 71 and the upper hinge mount surface 72.

To prevent this, the projection enlarging portions 107 are provided on the stiffener reinforcing member 45 and arranged at portions facing the upper continuous surface 74A of the pillar stiffener 42. More specifically, the projection enlarging portion 107 is provided on the stiffener reinforcing front wall 102 of the stiffener reinforcing member 45, and the projection enlarging portion 107 is provided on the stiffener reinforcing rear wall 103.

The projection enlarging portion 107 on the stiffener reinforcing front wall 102 and the projection enlarging portion 107 on the stiffener reinforcing rear wall 103 are portions having almost the same shape.

The projection width W3 of each projection enlarging portion 107 is formed to be larger than those of other portions of the stiffener reinforcing front wall 102 or the stiffener reinforcing rear wall 103. Hence, the rigidity/strength of the projection enlarging portions 107 can be made higher than those of the other portions.

The upper continuous surface 74A having a rigidity/strength lower than those of the general surface 71 and the upper hinge mount surface 72 can thus be reinforced by the projection enlarging portions 107, and the rigidity/strength of the left center pillar 15 (see FIG. 3) can be ensured.

As shown in FIG. 4, the upper continuous surface 74A of the stiffener outside wall 61 is provided on the upper hinge mount surface 72 (that is, near the upper door hinge 33). Hence, an impact load F2 input to the upper door hinge 33 is input to the upper continuous surface 74A via the upper hinge mount surface 72 at an early stage.

When the upper continuous surface 74A is reinforced by the projection enlarging portions 107, the impact load F2 input to the upper continuous surface 74A can suitably be supported.

Figure 16:
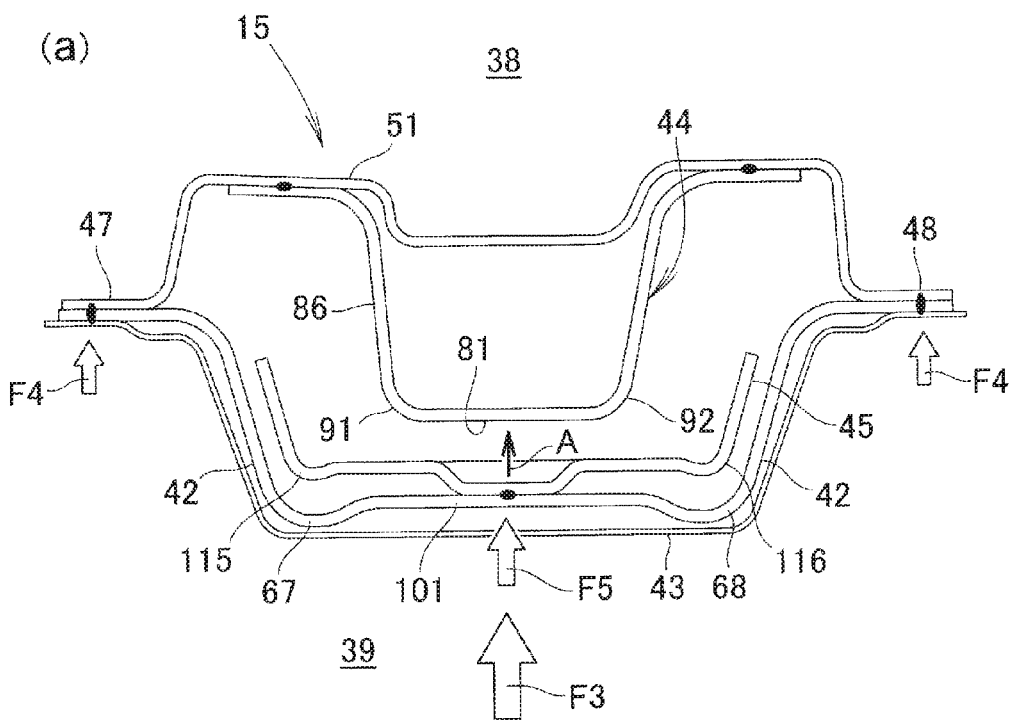
Figure 16:
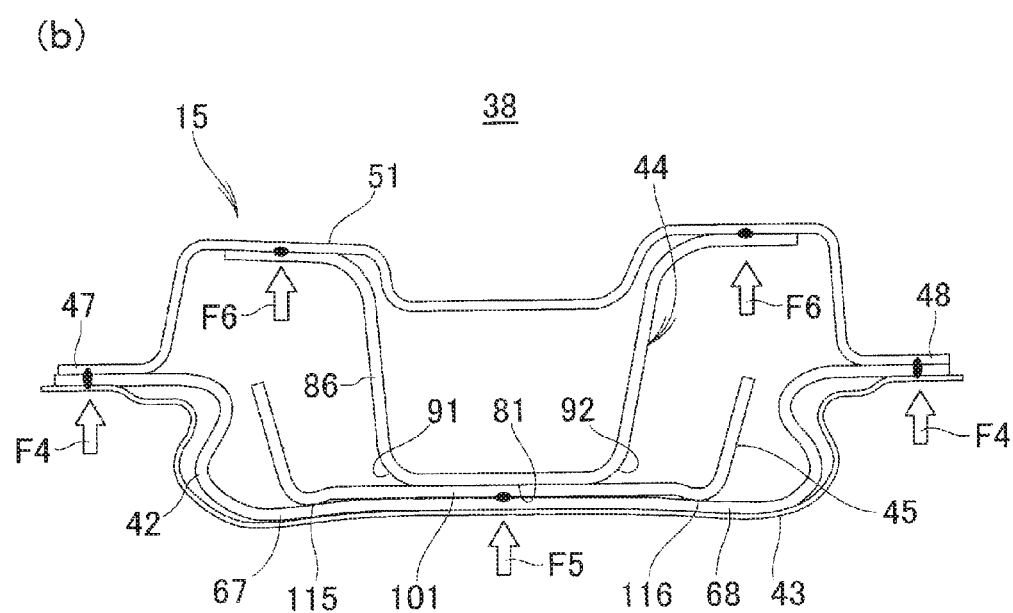

An example in which an impact load F3 input to the left center pillar 15 from the side of the exterior 39 is supported by the inner reinforcing member 44 and the like will be described next with reference to FIG. 16.

As shown in FIG. 16(a), the impact load F3 is input to the left center pillar 15 from the side of the exterior 39. Part of the impact load F3 is transmitted to the front flange joint 47 and the rear flange joint 48 as a load F4.

Simultaneously, the pillar outer 43, the pillar stiffener 42, and the stiffener reinforcing member 45 are deformed as indicated by an arrow A by a remaining load F5 of the impact load F3.

As shown in FIG. 16(b), when the pillar outer 43, the pillar stiffener 42, and the stiffener reinforcing member 45 are deformed, the pillar stiffener 42 hits the inner reinforcing outside wall 81 of the inner reinforcing member 44 (U-shaped section portion 86) via the stiffener reinforcing member 45.

Hence, the remaining load F5 is transmitted to the inner inside wall 51 via the stiffener reinforcing member 45 and the inner reinforcing member 44 as a load F6.

The stiffener reinforcing outside wall 101 of the stiffener reinforcing member 45 is arranged so as to overlap the inner reinforcing outside wall 81 of the U-shaped section portion 86 in the vehicle width direction. Hence, the stiffener reinforcing outside wall 101 is arranged at a position close to the inner reinforcing outside wall 81.

Hence, the remaining load F5 can quickly be transmitted to the inner reinforcing member 44 via the stiffener reinforcing member 45.

That is, the impact load F3 (see FIG. 16(a)) input to the left center pillar 15 can thus quickly be distributed to the front flange joint 47, the rear flange joint 48, and the inner inside wall 51.

This allows the left center pillar 15 to suitably absorb the impact load F3 and attain high shock absorption performance.

As shown in FIG. 16(a), the front ridge line 115 of the stiffener reinforcing member 45 is close to the front ridge line 67 of the pillar stiffener 42, and the rear ridge line 116 of the stiffener reinforcing member 45 is close to the rear ridge line 68 of the pillar stiffener 42.

Hence, as shown in FIG. 16(b), when the pillar stiffener 42 is deformed by the remaining load F5, part of the load F5 can quickly be transmitted from the front ridge line 67 and the rear ridge line 68 of the pillar stiffener 42 to the front ridge line 115 and the rear ridge line 116 of the stiffener reinforcing member 45. This allows the stiffener reinforcing member 45 (in particular, the front ridge line 115 and the rear ridge line 116) to quickly absorb part of the remaining load F5.

The U-shaped section portion 86 of the inner reinforcing member 44 bulges toward the exterior 39. Hence, in a state in which the pillar stiffener 42 is deformed to hit the inner reinforcing member 44, the rigidity/strength of the U-shaped section portion 86 can be ensured to the load F5 transmitted to the U-shaped section portion 86.

That is, the load F5 transmitted to the U-shaped section portion 86 can be supported by the U-shaped section portion 86.

This can suppress compressive deformation of the left center pillar 15 toward the interior 38 and a decrease in the space of the interior 38.

In addition, when the impact load F3 input to the pillar stiffener 42 is distributed to the front flange joint 47, the rear flange joint 48, and the inner inside wall 51, the load F4 transmitted to the front flange joint 47 and the rear flange joint 48 can be suppressed small.

Accordingly, the strength to the impact load F3 is maintained in the front flange joint 47 and the rear flange joint 48 of the left center pillar 15, and the rigidity of the left center pillar 15 is ensured.

Figure 17:
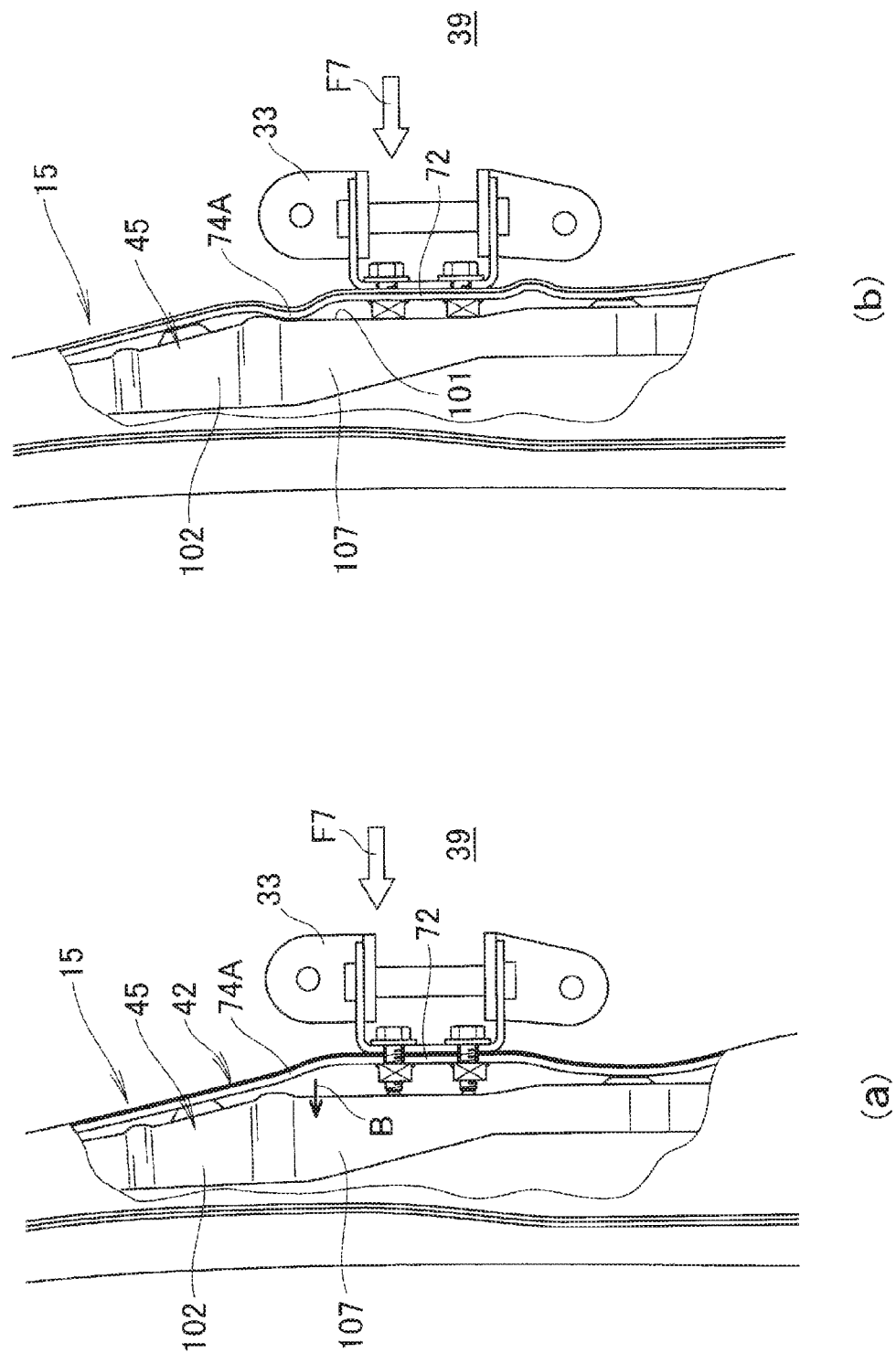

An example in which an impact load F7 input to the left center pillar 15 from outside in the vehicle width direction is supported by the stiffener reinforcing member 45 and the like will be described next with reference to FIG. 17.

Note that the projection enlarging portions 107 on the stiffener reinforcing front wall 102 and the stiffener reinforcing rear wall 103 (see FIG. 13) are almost the same members. The projection enlarging portion 107 on the stiffener reinforcing front wall 102 will be described below, and a description of the projection enlarging portion 107 on the stiffener reinforcing rear wall 103 will be omitted.

As shown in FIG. 17(a), the impact load F7 is input to the upper door hinge 33 from the side of the exterior 39. The input impact load F7 is transmitted to the upper hinge mount surface 72 of the pillar stiffener 42, and the upper continuous surface 74A of the pillar stiffener 42 is deformed by the transmitted impact load F7.

When deformed, the upper continuous surface 74A moves toward the stiffener reinforcing member 45 at an early stage, as indicated by an arrow B.

As shown in FIG. 17(b), the upper continuous surface 74A hits the stiffener reinforcing outside wall 101 of the stiffener reinforcing member 45. The projection enlarging portion 107 on the stiffener reinforcing front wall 102 is provided at a portion facing the upper continuous surface 74A.

Hence, when the upper continuous surface 74A hits the stiffener reinforcing outside wall 101, the impact load F7 is quickly transmitted to the projection enlarging portion 107 of the stiffener reinforcing member 45 via the upper continuous surface 74A.

The rigidity/strength of the projection enlarging portion 107 on the stiffener reinforcing front wall 102 is ensured to be higher than those of other portions of the stiffener reinforcing front wall 102. The projection enlarging portion 107 can thus suitably support the impact load F7 transmitted from the upper continuous surface 74A.

Note that the vehicle body side structure according to the present invention is not limited to the above-described embodiment, and changes and modifications can properly be made.

For example, in the embodiment, an arrangement with the stiffener reinforcing member 45 intervening between the inner reinforcing member 44 and the pillar stiffener 42 has been described. However, the present invention is not limited to this, and an arrangement without the stiffener reinforcing member 45 intervening may be employed.

In this arrangement, if an impact load is input to the left center pillar 15 from the side of the exterior 39, the pillar stiffener 42 is deformed toward the interior 38 and hits the inner reinforcing member 44. Hence, the impact load input to the left center pillar 15 is transmitted to the inner front flange 54 and the inner rear flange 55 and also transmitted to the inner inside wall 51 via the inner reinforcing member 44.

Accordingly, the impact load input to the pillar stiffener 42 can be distributed to the inner front flange 54, the inner rear flange 55, and the inner inside wall 51 and suitably absorbed by the left center pillar 15, and the shock absorption performance of the left center pillar 15 can be increased.

In addition, the inner reinforcing member 44 bulges outward in the vehicle width direction. Hence, the pillar stiffener 42 deformed by the impact load input from outside in the vehicle width direction hits the inner reinforcing member 44 and transmits the load, thereby allowing the inner reinforcing member 44 to support the impact load.

This can suppress compressive deformation of the left center pillar 15 inward in the vehicle width direction and a decrease in the space of the interior 38.

In the embodiment, an example in which the bolt 36 can be prevented by the through hole 112 from hitting the stiffener reinforcing member 45 has been described. However, the present invention is not limited to this, and, for example, a concave portion may be used in place of the through hole 112.

When a concave portion is used in place of the through hole 112, the rigidity/strength of the stiffener reinforcing member 45 can further be increased.

In the embodiment, an example in which the upper door hinge 33 and the lower door hinge 34 are mounted by the bolts 36 and the nuts 37 has been described. However, the present invention is not limited to this, and another fastening member such as a rivet may be used.

The shapes and formation of the vehicle body side structure, the left and right center pillars, the rear side door, the upper and lower door hinges, the pillar inner, the pillar stiffener, the inner reinforcing member, the stiffener reinforcing member, the pillar closed section, the inner inside wall, the inner front wall, the inner rear wall, the inner front flange, the inner rear flange, the stiffener outside wall, the inner reinforcing outside wall, the inner reinforcing front wall, the inner reinforcing rear wall, the inner reinforcing front flange, the inner reinforcing rear flange, the U-shaped section portion, the inner reinforcing section enlarging portion, the stiffener reinforcing outside wall, the stiffener reinforcing front wall, the stiffener reinforcing rear wall, the projection reducing portion, the projection enlarging portion, the through hole, and the like described in the embodiment are not limited to those exemplified, and can be properly changed.

INDUSTRIAL APPLICABILITY

The present invention can suitably be applied to an automobile with a vehicle body side structure including a center pillar extending in the vertical direction on a body side portion and a pillar closed section in the center pillar.

REFERENCE NUMERALS

10 . . . vehicle body side structure
11 . . . left body side portion (body side portion)
15, 16 . . . left and right center pillars (center pillar)
31 . . . rear side door (side door)
33, 34 . . . upper and lower door hinges (door hinge)
36 . . . bolt
37 . . . nut
41 . . . pillar inner
42 . . . pillar stiffener
44 . . . inner reinforcing member
45 . . . stiffener reinforcing member
49 . . . pillar closed section (closed section)
51 . . . inner inside wall
51b . . . front end of inner inside wall (end on body front side)
51c . . . rear end of inner inside wall (end on body rear side)
52 . . . inner front wall
53 . . . inner rear wall
54 . . . inner front flange
55 . . . inner rear flange
61 . . . stiffener outside wall
62 . . . stiffener front wall
63 . . . stiffener rear wall
71 (71A, 71B) . . . general surface (upper and lower general surfaces)
72, 73 . . . upper and lower hinge mount surfaces (hinge mount surface)
74 (74A, 74B) . . . continuous surface (upper and lower continuous surfaces)
81 . . . inner reinforcing outside wall
81b . . . front end of inner reinforcing outside wall (end on body front side)
81c . . . rear end of inner reinforcing outside wall (end on body rear side)
82 . . . inner reinforcing front wall
83 . . . inner reinforcing rear wall
84 . . . inner reinforcing front flange
85 . . . inner reinforcing rear flange
86 . . . U-shaped section portion (portion formed into substantially U-shaped section)
88 . . . inner reinforcing section enlarging portion
101 . . . stiffener reinforcing outside wall
101d . . . front end of stiffener reinforcing outside wall (end on body front side)
101e . . . rear end of stiffener reinforcing outside wall (end on body rear side)
102 . . . stiffener reinforcing front wall
103 . . . stiffener reinforcing rear wall
108 . . . projection reducing portion
107 . . . projection enlarging portion
112 . . . through hole
S1 . . . predetermined interval
S2 . . . gap larger than predetermined interval
W3 . . . projection width of projection enlarging portion
W4 . . . projection width of projection reducing portion

The invention claimed is:
1. A vehicle body side structure including a center pillar extending in a vertical direction on a body side portion, wherein the center pillar comprises:
a pillar inner provided inside in a vehicle width direction;
a pillar stiffener including a portion formed into a substantially U-shaped section so as to form a closed section together with the pillar inner when joined to the pillar inner from outside in the vehicle width direction;
an inner reinforcing member arranged in the closed section between the pillar stiffener and the pillar inner; and
a stiffener reinforcing member formed from a structure independent of the inner reinforcing member and extending in the vertical direction outside the inner reinforcing member in the vehicle width direction, the stiffener reinforcing member joined to an inside of the pillar stiffener in the vehicle width direction and arranged so as to overlap the inner reinforcing member in the vehicle width direction,
the pillar inner is formed into a substantially hat-shaped section by:
an inner inside wall arranged inside in the vehicle width direction;
an inner front wall and an inner rear wall, which extend outward in the vehicle width direction from ends on vehicle body front and rear sides out of the inner inside wall;
an inner front flange extending from the inner front wall to the vehicle body front side and joined to the pillar stiffener; and
an inner rear flange extending from the inner rear wall to the vehicle body rear side and joined to the pillar stiffener,
the inner reinforcing member is formed into a substantially hat-shaped section by:
an inner reinforcing outside wall arranged outside in the vehicle width direction:
an inner reinforcing front wall and an inner reinforcing rear wall, which extend inward in the vehicle width direction from ends on the body front and rear sides out of the inner reinforcing outside wall;
an inner reinforcing front flange extending from the inner reinforcing front wall to the body front side; and
an inner reinforcing rear flange extending from the inner reinforcing rear wall to the body rear side,
the inner reinforcing front flange and the inner reinforcing rear flange are joined to the inner inside wall of the pillar inner,
the stiffener reinforcing member is formed into a substantially U-shaped section by:
a stiffener reinforcing outside wall arranged outside in the vehicle width direction; and
a stiffener reinforcing front wall and a stiffener reinforcing rear wall, which extend inward in the vehicle width direction from ends on the body front and rear sides out of the stiffener reinforcing outside wall, the inner reinforcing member comprises an inner reinforcing section enlarging portion which is arranged in substantially the U-shaped section formed by the stiffener reinforcing member and whose width in a back-and-forth direction of the vehicle body increases downward, and each of the stiffener reinforcing front wall and the stiffener reinforcing rear wall comprises, at a portion facing the inner reinforcing section enlarging portion, a projection reducing portion whose projection width in the vehicle width direction is smaller as compared to other portions.

2. A vehicle body side structure including a center pillar extending in a vertical direction on a body side portion, wherein the center pillar comprises:

a pillar inner provided inside in a vehicle width direction;

a pillar stiffener including a portion formed into a substantially U-shaped section so as to form a closed section together with the pillar inner when joined to the pillar inner from outside in the vehicle width direction;

an inner reinforcing member arranged in the closed section between the pillar stiffener and the pillar inner; and a stiffener reinforcing member formed from a structure independent of the inner reinforcing member and extending in the vertical direction outside the inner reinforcing member in the vehicle width direction, the stiffener reinforcing member joined to an inside of the pillar stiffener in the vehicle width direction and arranged so as to overlap the inner reinforcing member in the vehicle width direction, the pillar inner is formed into a substantially hat-shaped section by:

an inner inside wall arranged inside in the vehicle width direction;

an inner front wall and an inner rear wall, which extend outward in the vehicle width direction from ends on vehicle body front and rear sides out of the inner inside wall;

an inner front flange extending from the inner front wall to the vehicle body front side and joined to the pillar stiffener; and an inner rear flange extending from the inner rear wall to the vehicle body rear side and joined to the pillar stiffener, the inner reinforcing member is formed into a substantially hat-shaped section by:

an inner reinforcing outside wall arranged outside in the vehicle width direction:

an inner reinforcing front wall and an inner reinforcing rear wall, which extend inward in the vehicle width direction from ends on the body front and rear sides out of the inner reinforcing outside wall;

an inner reinforcing front flange extending from the inner reinforcing front wall to the body front side; and an inner reinforcing rear flange extending from the inner reinforcing rear wall to the body rear side, the inner reinforcing front flange and the inner reinforcing rear flange are joined to the inner inside wall of the pillar inner, the pillar stiffener comprises a stiffener outside wall which forms a wall portion outside in the vehicle width direction, the stiffener outside wall comprises:

a general surface arranged at a predetermined interval with respect to the stiffener reinforcing member;

a hinge mount surface which bulges outward in the vehicle width direction with respect to the general surface and on which a door hinge configured to support a side door is mounted; and a continuous surface through which the hinge mount surface and the general surface continue, and the stiffener reinforcing outside wall is joined to the general surface on upper and lower sides of the hinge mount surface and arranged with a gap larger than the predetermined interval with respect to the hinge mount surface.

3. The vehicle body side structure according to claim 2, wherein each of the stiffener reinforcing front wall and the stiffener reinforcing rear wall comprises, at a portion facing the continuous surface of the pillar stiffener, a projection enlarging portion whose projection width is larger as compared to other portions.

4. The vehicle body side structure according to claim 2, wherein a nut configured to mount the door hinge is arranged in the gap formed between the hinge mount surface and the stiffener reinforcing outside wall.

5. The vehicle body side structure according to claim 4, wherein in the stiffener reinforcing member, at a portion facing the nut, a through hole configured to avoid interference of a bolt fastened to the nut is formed, and the door hinge is mounted on the hinge mount surface by the bolt and the nut.

* * * * *